US 8,958,323 B2

(12) United States Patent
Bai et al.

(10) Patent No.: US 8,958,323 B2
(45) Date of Patent: Feb. 17, 2015

(54) COMMUNICATION SYSTEM WITH SIGNAL PROCESSING MECHANISM FOR TONE ESTIMATION AND METHOD OF OPERATION THEREOF

(75) Inventors: Dongwoon Bai, San Diego, CA (US); Heejin Roh, San Diego, CA (US); Jungwon Lee, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 275 days.

(21) Appl. No.: 13/424,237

(22) Filed: Mar. 19, 2012

(65) Prior Publication Data

US 2012/0236744 A1    Sep. 20, 2012

Related U.S. Application Data

(60) Provisional application No. 61/454,523, filed on Mar. 19, 2011.

(51) Int. Cl.
  *H04L 27/26* (2006.01)
(52) U.S. Cl.
  CPC .................................. *H04L 27/2662* (2013.01)
  USPC ......................................................... 370/252
(58) Field of Classification Search
  CPC ............ H04L 27/2675; H04L 27/2668; H04L 27/2662; H04L 27/2647; H04L 27/2613
  USPC .......................................... 370/203–211, 252
  See application file for complete search history.

(56) References Cited

U.S. PATENT DOCUMENTS

| 6,965,068 | B2 | 11/2005 | Moriat |
| 7,124,042 | B2 | 10/2006 | Rao |
| 7,856,063 | B2 | 12/2010 | Coulson |
| 2007/0036179 | A1* | 2/2007 | Palanki et al. ................. 370/491 |
| 2007/0115795 | A1* | 5/2007 | Gore et al. ..................... 370/203 |
| 2011/0064070 | A1* | 3/2011 | Gore et al. ..................... 370/344 |
| 2011/0141876 | A1* | 6/2011 | Kuchi et al. ................... 370/203 |
| 2011/0142003 | A1* | 6/2011 | Kuchi et al. ................... 370/330 |
| 2011/0216704 | A1* | 9/2011 | Khandekar et al. ........... 370/328 |
| 2012/0188994 | A1* | 7/2012 | Palanki et al. ................ 370/344 |

OTHER PUBLICATIONS

Aboutanios et al., "Iterative Frequency Estimation by Interpolation on Fourier Coefficients", "IEEE Tansactions on Signal Processing", Apr. 2005, pp. 1237-1242, vol. 53, No. 4, Publisher: IEEE.
Awoseyila et al., "Improved single frequency estimation with wide acquisition range", "Electronic Letters", Jan. 31, 2008, pp. 245-247, vol. 44, No. 3.
Jacobsen et al., "Fast, Accurate Frequency Estimators (dsp Tips & Tricks)", "IEEE Signal Process", May 2007, pp. 123-125, vol. 24, No. 3, Publisher: IEEE.
Kay, "A Fast and Accurate Single Frequency Estimator", "IEEE Transactions on Acoust. Speech, Signal Process", Dec. 1989, pp. 1987-1990, vol. 37, No. 12, Publisher: IEEE.

(Continued)

*Primary Examiner* — Paul H Masur
(74) *Attorney, Agent, or Firm* — IP Investment Law Group

(57) ABSTRACT

A method of operation of a communication system includes: converting time-domain data to frequency-domain data based on an N-point transform size; generating K-point data based on the frequency-domain data and the N-point transform size; and determining a tone interference frequency based on the K-point data for elimination of tone interference to improve system performance.

20 Claims, 9 Drawing Sheets

(56) References Cited

OTHER PUBLICATIONS

Lank et al., "A Semicoherent Detection and Doppler Estimation Statistic", "IEEE Trans. Aerosp. Electron Syst.", Mar. 1973, pp. 151-165, vol. AES-9, No. 2, Publisher: IEEE.

Leung et al., "Modified Kay's method with improved frequency estimation", "Electronics Letters", May 11, 2000, pp. 918-920, vol. 36, No. 10, Publisher: Electronics Letters.

MacLeod, "Fast Nearly ML Estimation of the Parameters of Real or Complex Single Tones or Resolved Multiple Tones", "IEEE Transaction on Signal Processing", Jan. 1998, pp. 141-148, vol. 46, No. 1, Publisher: IEEE.

Rife et al., "Single-Tone Parameter Estimation from Descrete-Time Observations", "IEEE Transactions on Information Theory", Sep. 1974, pp. 591-598, vol. IT-20, No. 5, Publisher: IEEE.

Yang et al., "An Estimation-Range Extended Autocorrelation-Based Frequency Estimator", "EURASIPJournal on Advances in Signal Processing", 2009, p. 7 pages, No. 961938, Publisher: Hindawi Publishing Corp, Published in: CN.

* cited by examiner

COMMUNICATION SYSTEM WITH SIGNAL PROCESSING MECHANISM FOR TONE ESTIMATION AND METHOD OF OPERATION THEREOF

CROSS-REFERENCE TO RELATED APPLICATION

This application claims the benefit of U.S. Provisional Patent Application Ser. No. 61/454,523 filed Mar. 19, 2011, and the subject matter thereof is incorporated herein by reference thereto.

TECHNICAL FIELD

The present invention relates generally to a communication system and more particularly to a system with signal processing mechanism.

BACKGROUND ART

A cellular network is a radio network distributed over land areas called cells, each served by at least one fixed-location transceiver known as a cell site or base station. When joined together, these cells provide radio coverage over a wide geographic area. This enables a large number of portable transceivers (e.g., mobile phones, pagers, etc.) to communicate with each other and with fixed transceivers and telephones anywhere in the network, via base stations, even if some of the transceivers are moving through more than one cell during transmission.

4G stands for the fourth generation of cellular wireless standards. It is a successor to third-generation (3G) and second-generation (2G) families of cellular wireless standards. A 4G system is expected to provide a comprehensive and secure all-Internet Protocol (IP) based mobile broadband solution to smartphones, laptop computer wireless modems, and other mobile devices. Facilities such as ultra-broadband Internet access, IP telephony, gaming services, and streamed multimedia may be provided to users.

Thus, a need still remains for reliable and fast cellular networks. In view of the shrinking amount of available frequencies, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a communication system, including: converting time-domain data to frequency-domain data based on an N-point transform size; generating K-point data based on the frequency-domain data and the N-point transform size; and determining a tone interference frequency based on the K-point data for elimination of tone interference to improve system performance.

The present invention provides a communication system, including: an N-point transform module for converting time-domain data to frequency-domain data based on an N-point transform size; a K-point transform module, coupled to the N-point transform modules, for generating K-point data based on the frequency-domain data and the N-point transform size; and a frequency calculation module, coupled to the K-point transform module, for determining a tone interference frequency based on the K-point data for elimination of tone interference to improve system performance.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
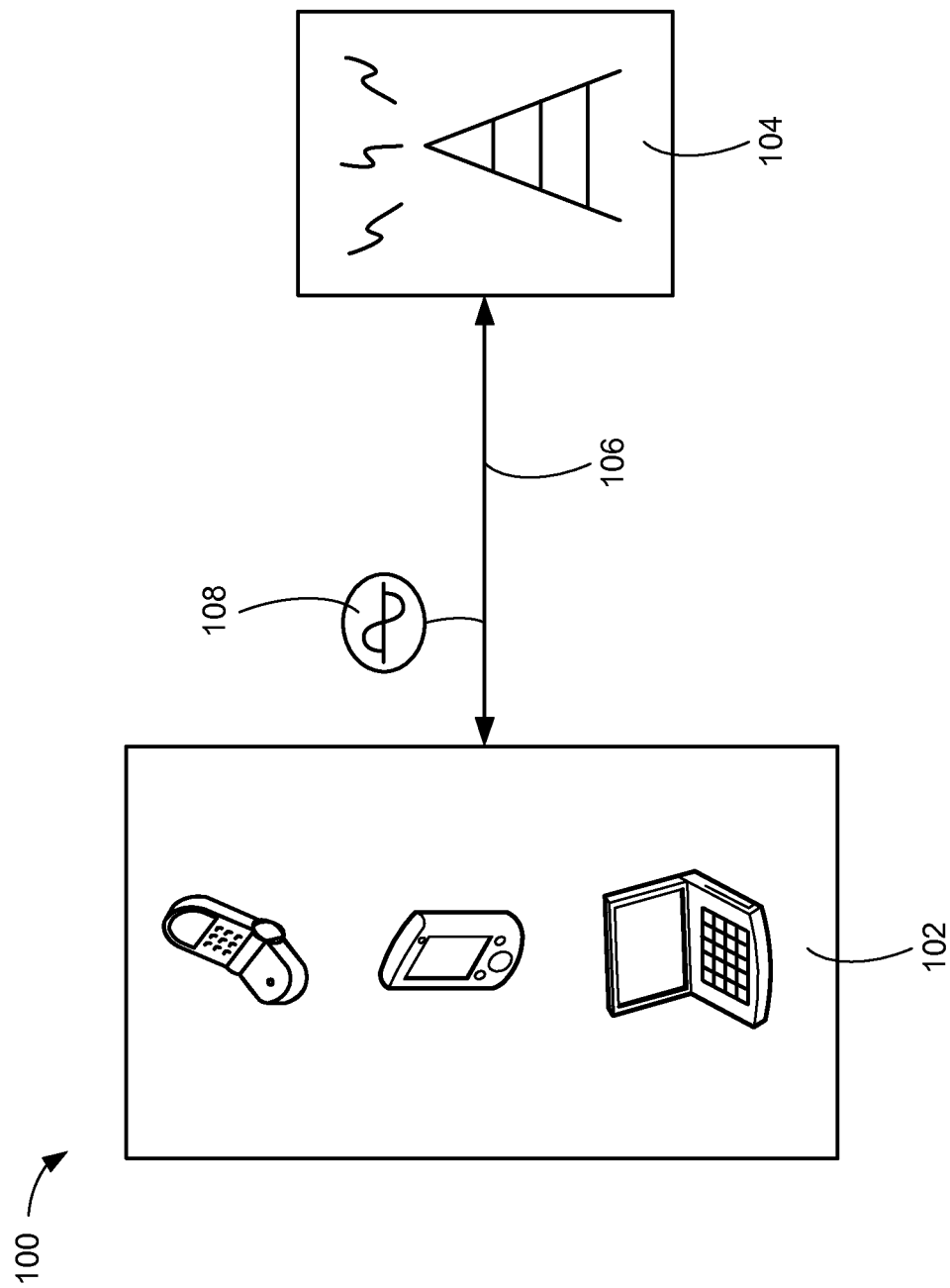
FIG. 1 is a communication system with signal processing mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

The term "module" referred to herein can include software, hardware, or a combination thereof in the present invention in accordance with the context in which the term is used. For example, the software can be machine code, firmware, embedded code, and application software. Also for example, the hardware can be circuitry, processor, computer, integrated circuit, integrated circuit cores, a pressure sensor, an inertial sensor, a microelectromechanical system (MEMS), passive devices, or a combination thereof.

The problem of tone parameter estimation has been addressed by taking discrete Fourier transform (DFT) of the time domain signal or using average autocorrelations. The DFT-based estimator has shown superior performance than the average autocorrelation estimator for moderately noisy samples since the DFT-based estimator approximately practices the maximum likelihood (ML) principle. One approach is to take DFT first and then interpolate the peak and its neighbors. However, the performance of existing methods using only one block of DFT output is limited by the known fundamental limit of the available DFT size.

Most of recent studies on DFT based estimators have focused on improving the interpolation performance providing fine frequency estimation, and the issue of the computational complexity of performing large size DFT remain unsolved. Moreover, this improvement on the interpolation performance has been marginal because the gap between the performances of existing DFT based estimators and the Cramér-Rao (CR) bound is already small.

Autocorrelation based estimators have been studied because the computational complexity of DFT based estimators is considered to be significant even with the use of fast Fourier transform (FFT). However, autocorrelation based estimators have either substantial performance loss with respect to DFT based estimators or a limited estimation range. Some methods have tried to extend the estimation range of autocorrelation-based estimators while improving its estimation performance but these attempts end up with estimators that are computationally more complex than DFT based estimators.

A hybrid estimator has been proposed but also needs to perform DFT. No known method exists for reduction of the computational complexity of large size DFT. The performance of existing DFT based methods using only one block of DFT output is inevitably limited by the CR bound of this DFT size.

In some cases, the additive tone interference of minimal power can degrade the system performance when data is aligned with frequency, for example, in orthogonal frequency-division multiplexing (OFDM) systems. It is important to estimate tone parameters reliably even if the tone amplitude is negligibly small in time domain because the mitigation of tone interference relies on the accuracy of parameter estimation. An estimator with one block of frequency domain observations is not enough to estimate tone parameters even if the estimator can achieve the CR bound. The only way to improve the estimation performance that is already close to the CR bound is to increase the sample size.

The Cooley-Tukey FFT or the prime-factor FFT operation can be used for combining with re-indexing. However, their input should be re-indexed, which can be a drawback of these operations in addition to multiplication of twiddle factors for the Cooley-Tukey FFT as well as complicated re-indexing and the prime-factor condition for the prime-factor FFT. These operations require the system to wait for all data samples to be collected before processing the input. For some cases, this requirement of input re-indexing not only causes additional delay but also limits its application, for example, in OFDM systems.

Embodiments of the present invention provide answers or solutions to the problems by providing improved operations to reliably estimate frequency and amplitude of tone interference from frequency domain observations.

Referring now to FIG. 1, therein is shown a communication system 100 with signal processing mechanism in an embodiment of the present invention. The communication system 100 includes a first station 102, such as a mobile station, connected to a second station 104, such as a base station, with a communication path 106, such as a wireless or wired network.

For example, the first station 102 can be of any of a variety of mobile devices, such as user equipment (UE), a cellular phone, personal digital assistant, a notebook computer, automotive telematic communication system, or other multi-functional mobile communication or entertainment device. The first station 102 can be a standalone device, or can be incorporated with a vehicle, for example a car, truck, bus, or train. The first station 102 can couple to the communication path 106 to communicate with the second station 104.

For illustrative purposes, the communication system 100 is described with the first station 102 as a mobile computing device, although it is understood that the first station 102 can be different types of computing devices. For example, the first station 102 can also be a non-mobile computing device, such as a base station, a base station farm, or a desktop computer.

The second station 104 can be used to relay electronic messages and signals from and to the first station 102. The second station 104 can be any of a variety of centralized or decentralized computing devices. For example, the second station 104 can be a cellular routing devices, cell tower systems, evolved nodes B ("eNB"), computers, grid computing resources, virtualized computer resources, cloud computing resources, routers, switches, peer-to-peer distributed computing devices, or a combination thereof.

The second station 104 can be centralized in a single computer room, distributed across different rooms, distributed across different geographical locations, embedded within a telecommunications network, or attached to a tower. The second station 104 can have a means for coupling with the communication path 106 to communicate with the first station 102. The second station 104 can also be a mobile station type device as described for the first station 102.

In another example, the first station 102 can be a particularized mobile machine, such as a mobile mainframe, a mobile base station, a cluster base station, a rack mounted base station in a vehicle, or a mobile blade base station, or as more specific examples, an IBM System z10™ Business Class mainframe or a HP ProLiant ML™ base station. Yet another example, the second station 104 can be a particularized machine, such as a portable computing device, a thin mobile station, a notebook, a netbook, a smartphone, personal digital assistant, or a cellular phone, and as specific examples, a Samsung Galaxy S™, a Samsung Galaxy Tab™, an Apple iPhone™, Palm Centro™, or Moto Q Global™.

For illustrative purposes, the communication system 100 is described with the second station 104 as a non-mobile computing device, although it is understood that the second station 104 can be different types of computing devices. For example, the second station 104 can also be a mobile computing device, such as notebook computer, another mobile station device, or a different type of mobile station device. The second station 104 can be a standalone device, or can be incorporated with a vehicle, for example a car, truck, bus, or train. The second station 104 can be towers or buildings containing a mobile computing device or a standalone device.

Also for illustrative purposes, the communication system 100 is shown with the second station 104 and the first station 102 as end points of the communication path 106, although it is understood that the communication system 100 can have a different partition between the first station 102, the second station 104, and the communication path 106. For example, the first station 102, the second station 104, or a combination thereof can also function as part of the communication path 106.

The communication path 106 can be a variety of networks. For example, the communication path 106 can include wireless communication, wired communication, optical, ultrasonic, or the combination thereof. Fourth generation (4G) cellular wireless networks, wireless radio frequency channel, a multi-channel cellular network, an Evolved High Speed Packet Access ("HSPA+") network, a Third Generation Partnership Project Long Term Evolution ("3GPP LTE") network, a 3GPP LTE-Advanced network, and other cellular network are examples of wireless communication that can be included in the communication path 106.

Satellite communication, cellular communication, Bluetooth, Infrared Data Association standard (IrDA), wireless fidelity (WiFi), and worldwide interoperability for microwave access (WiMAX) are also examples of wireless communication that can be included in the communication path 106. Ethernet, digital subscriber line (DSL), fiber to the home (FTTH), and plain old telephone service (POTS) are examples of wired communication that can be included in the communication path 106.

Further, the communication path 106 can traverse a number of network topologies and distances. For example, the communication path 106 can include direct connection, personal area network (PAN), local area network (LAN), metropolitan area network (MAN), wide area network (WAN) or any combination thereof.

The communication system 100 can include a time-domain data 108 transmitted through the communication path 106. The time-domain data 108 can be transmitted between the first station 102 and the second station 104. The time-domain data 108 represent a signal that is described or analyzed with respect to discrete time. For example, the time-domain data 108 can represent information that is sent from the second station 104 to the first station 102.

Figure 2:
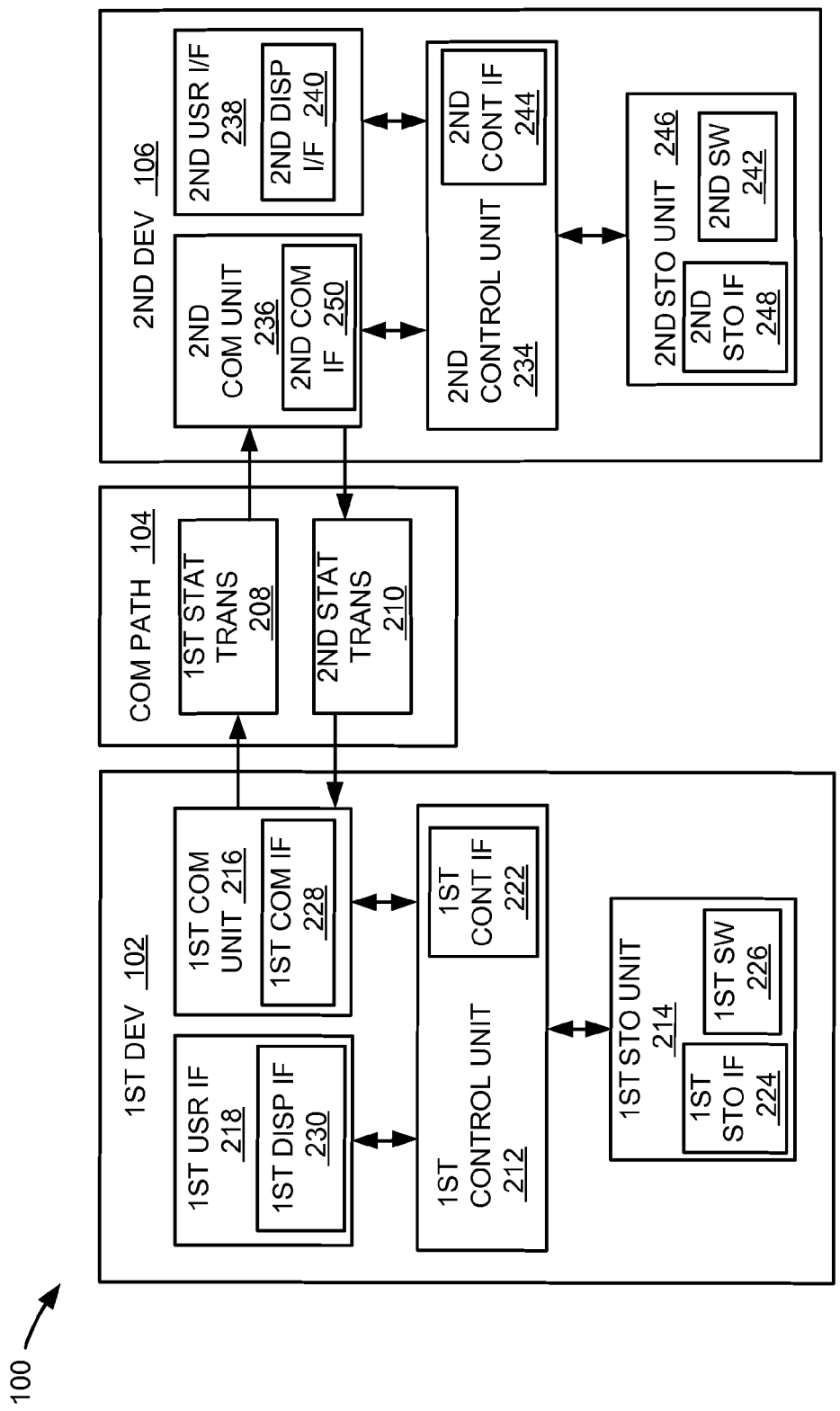
FIG. 2 is an exemplary block diagram of the communication system.

Referring now to FIG. 2, therein is shown an exemplary block diagram of the communication system 100. The first station 102 can send information in a first station transmission 208 over the communication path 106 to the second station 104. The second station 104 can send information in a second station transmission 210 over the communication path 106 to the first station 102.

For illustrative purposes, the communication system 100 is shown with the first station 102 as a mobile station device, although it is understood that the communication system 100 can have the first station 102 as a different type of device. For example, the first station 102 can be a base station.

Also for illustrative purposes, the communication system 100 is shown with the second station 104 as a base station, although it is understood that the communication system 100 can have the second station 104 as a different type of device. For example, the second station 104 can be a mobile station device.

For brevity of description in this embodiment of the present invention, the first station 102 will be described as a mobile station device and the second station 104 will be described as a base station device. The present invention is not limited to this selection for the type of devices. The selection is an example of the present invention.

The first station 102 can include a first control unit 212, a first storage unit 214, a first communication unit 216, and a first user interface 218. The first control unit 212 can include a first control interface 222. The first control unit 212 can execute a first software 226 to provide the intelligence of the communication system 100.

The first control unit 212 can be implemented in a number of different manners. For example, the first control unit 212 can be a processor, an embedded processor, a microprocessor, a hardware control logic, a hardware finite state machine (FSM), a digital signal processor (DSP), or a combination thereof.

The first control interface 222 can be used for communication between the first control unit 212 and other functional units in the first station 102. The first control interface 222 can also be used for communication that is external to the first station 102.

The first control interface 222 can receive information from the other functional units or from external sources, or can transmit information to the other functional units or to external destinations. The external sources and the external destinations refer to sources and destinations external to the first station 102.

The first control interface 222 can be implemented in different ways and can include different implementations depending on which functional units or external units are being interfaced with the first control interface 222. For example, the first control interface 222 can be implemented with a pressure sensor, an inertial sensor, a microelectromechanical system (MEMS), optical circuitry, waveguides, wireless circuitry, wireline circuitry, or a combination thereof.

The first storage unit 214 can store the first software 226. The first storage unit 214 can also store the relevant information, such as advertisements, points of interest (POI), navigation routing entries, or any combination thereof.

The first storage unit 214 can be a volatile memory, a nonvolatile memory, an internal memory, an external memory, or a combination thereof. For example, the first storage unit 214 can be a nonvolatile storage such as nonvolatile random access memory (NVRAM), Flash memory, disk storage, or a volatile storage such as static random access memory (SRAM).

The first storage unit 214 can include a first storage interface 224. The first storage interface 224 can also be used for communication that is external to the first station 102.

The first storage interface 224 can receive information from the other functional units or from external sources, or can transmit information to the other functional units or to external destinations. The external sources and the external destinations refer to sources and destinations external to the first station 102.

The first storage interface 224 can include different implementations depending on which functional units or external units are being interfaced with the first storage unit 214. The first storage interface 224 can be implemented with technologies and techniques similar to the implementation of the first control interface 222.

The first communication unit 216 can enable external communication to and from the first station 102. For example, the first communication unit 216 can permit the first station 102 to communicate with the second station 104, an attachment, such as a peripheral device or a computer desktop, and the communication path 106.

The first communication unit 216 can also function as a communication hub allowing the first station 102 to function as part of the communication path 106 and not limited to be an end point or terminal unit to the communication path 106. The first communication unit 216 can include active and passive components, such as microelectronics or an antenna, for interaction with the communication path 106.

The first communication unit 216 can include a first communication interface 228. The first communication interface 228 can be used for communication between the first communication unit 216 and other functional units in the first station 102. The first communication interface 228 can receive information from the other functional units or can transmit information to the other functional units.

The first communication interface 228 can include different implementations depending on which functional units are being interfaced with the first communication unit 216. The first communication interface 228 can be implemented with technologies and techniques similar to the implementation of the first control interface 222.

The first user interface 218 allows a user (not shown) to interface and interact with the first station 102. The first user interface 218 can include an input device and an output device. Examples of the input device of the first user interface 218 can include a keypad, a touchpad, soft-keys, a keyboard, a microphone, or any combination thereof to provide data and communication inputs.

The first user interface 218 can include a first display interface 230. The first display interface 230 can include a display, a projector, a video screen, a speaker, or any combination thereof.

The first control unit 212 can operate the first user interface 218 to display information generated by the communication system 100. The first control unit 212 can also execute the first software 226 for the other functions of the communication system 100. The first control unit 212 can further execute the first software 226 for interaction with the communication path 106 via the first communication unit 216.

The second station 104 can be optimized for implementing the present invention in a multiple device embodiment with the first station 102. The second station 104 can provide the additional or higher performance processing power compared to the first station 102. The second station 104 can include a second control unit 234, a second communication unit 236, and a second user interface 238.

The second user interface 238 allows a user (not shown) to interface and interact with the second station 104. The second user interface 238 can include an input device and an output device. Examples of the input device of the second user interface 238 can include a keypad, a touchpad, soft-keys, a keyboard, a microphone, or any combination thereof to provide data and communication inputs. Examples of the output device of the second user interface 238 can include a second display interface 240. The second display interface 240 can include a display, a projector, a video screen, a speaker, or any combination thereof.

The second control unit 234 can execute a second software 242 to provide the intelligence of the second station 104 of the communication system 100. The second software 242 can operate in conjunction with the first software 226. The second control unit 234 can provide additional performance compared to the first control unit 212.

The second control unit 234 can operate the second user interface 238 to display information. The second control unit 234 can also execute the second software 242 for the other functions of the communication system 100, including operating the second communication unit 236 to communicate with the first station 102 over the communication path 106.

The second control unit 234 can be implemented in a number of different manners. For example, the second control unit 234 can be a processor, an embedded processor, a microprocessor, a hardware control logic, a hardware finite state machine (FSM), a digital signal processor (DSP), or a combination thereof.

The second control unit 234 can include a second control interface 244. The second control interface 244 can be used for communication between the second control unit 234 and other functional units in the second station 104. The second control interface 244 can also be used for communication that is external to the second station 104.

The second control interface 244 can receive information from the other functional units or from external sources, or can transmit information to the other functional units or to external destinations. The external sources and the external destinations refer to sources and destinations external to the second station 104.

The second control interface 244 can be implemented in different ways and can include different implementations depending on which functional units or external units are being interfaced with the second control interface 244. For example, the second control interface 244 can be implemented with a pressure sensor, an inertial sensor, a microelectromechanical system (MEMS), optical circuitry, waveguides, wireless circuitry, wireline circuitry, or a combination thereof.

A second storage unit 246 can store the second software 242. The second storage unit 246 can also store the relevant information, such as advertisements, points of interest (POI), navigation routing entries, or any combination thereof. The second storage unit 246 can be sized to provide the additional storage capacity to supplement the first storage unit 214.

For illustrative purposes, the second storage unit 246 is shown as a single element, although it is understood that the second storage unit 246 can be a distribution of storage elements. Also for illustrative purposes, the communication system 100 is shown with the second storage unit 246 as a single hierarchy storage system, although it is understood that the communication system 100 can have the second storage unit 246 in a different configuration. For example, the second storage unit 246 can be formed with different storage technologies forming a memory hierarchal system including different levels of caching, main memory, rotating media, or off-line storage.

The second storage unit 246 can be a volatile memory, a nonvolatile memory, an internal memory, an external memory, or a combination thereof. For example, the second storage unit 246 can be a nonvolatile storage such as nonvolatile random access memory (NVRAM), Flash memory, disk storage, or a volatile storage such as static random access memory (SRAM).

The second storage unit 246 can include a second storage interface 248. The second storage interface 248 can also be used for communication that is external to the second station 104.

The second storage interface 248 can receive information from the other functional units or from external sources, or can transmit information to the other functional units or to external destinations. The external sources and the external destinations refer to sources and destinations external to the second station 104.

The second storage interface 248 can include different implementations depending on which functional units or external units are being interfaced with the second storage unit 246. The second storage interface 248 can be implemented with technologies and techniques similar to the implementation of the second control interface 244.

The second communication unit 236 can enable external communication to and from the second station 104. For example, the second communication unit 236 can permit the second station 104 to communicate with the first station 102 over the communication path 106.

The second communication unit 236 can also function as a communication hub allowing the second station 104 to function as part of the communication path 106 and not limited to be an end point or terminal unit to the communication path 106. The second communication unit 236 can include active and passive components, such as microelectronics or an antenna, for interaction with the communication path 106.

The second communication unit 236 can include a second communication interface 250. The second communication interface 250 can be used for communication between the second communication unit 236 and other functional units in the second station 104. The second communication interface 250 can receive information from the other functional units or can transmit information to the other functional units.

The second communication interface 250 can include different implementations depending on which functional units are being interfaced with the second communication unit 236. The second communication interface 250 can be implemented with technologies and techniques similar to the implementation of the second control interface 244.

The first communication unit 216 can couple with the communication path 106 to send information to the second station 104 in the first station transmission 208. The second station 104 can receive information in the second communication unit 236 from the first station transmission 208 of the communication path 106.

The second communication unit 236 can couple with the communication path 106 to send information to the first station 102 in the second station transmission 210. The first station 102 can receive information in the first communication unit 216 from the second station transmission 210 of the communication path 106. The communication system 100 can be executed by the first control unit 212, the second control unit 234, or a combination thereof.

For illustrative purposes, the second station 104 is shown with the partition having the second user interface 238, the second storage unit 246, the second control unit 234, and the second communication unit 236, although it is understood that the second station 104 can have a different partition. For example, the second software 242 can be partitioned differently such that some or all of its function can be in the second control unit 234 and the second communication unit 236. In addition, the second station 104 can include other functional units not shown in FIG. 2 for clarity.

The functional units in the first station 102 can work individually and independently of the other functional units. The first station 102 can work individually and independently from the second station 104 and the communication path 106.

The functional units in the second station 104 can work individually and independently of the other functional units. The second station 104 can work individually and independently from the first station 102 and the communication path 106.

For illustrative purposes, the communication system 100 is described by operation of the first station 102 and the second station 104. It is understood that the first station 102 and the second station 104 can operate any of the modules and functions of the communication system 100.

Figure 3:
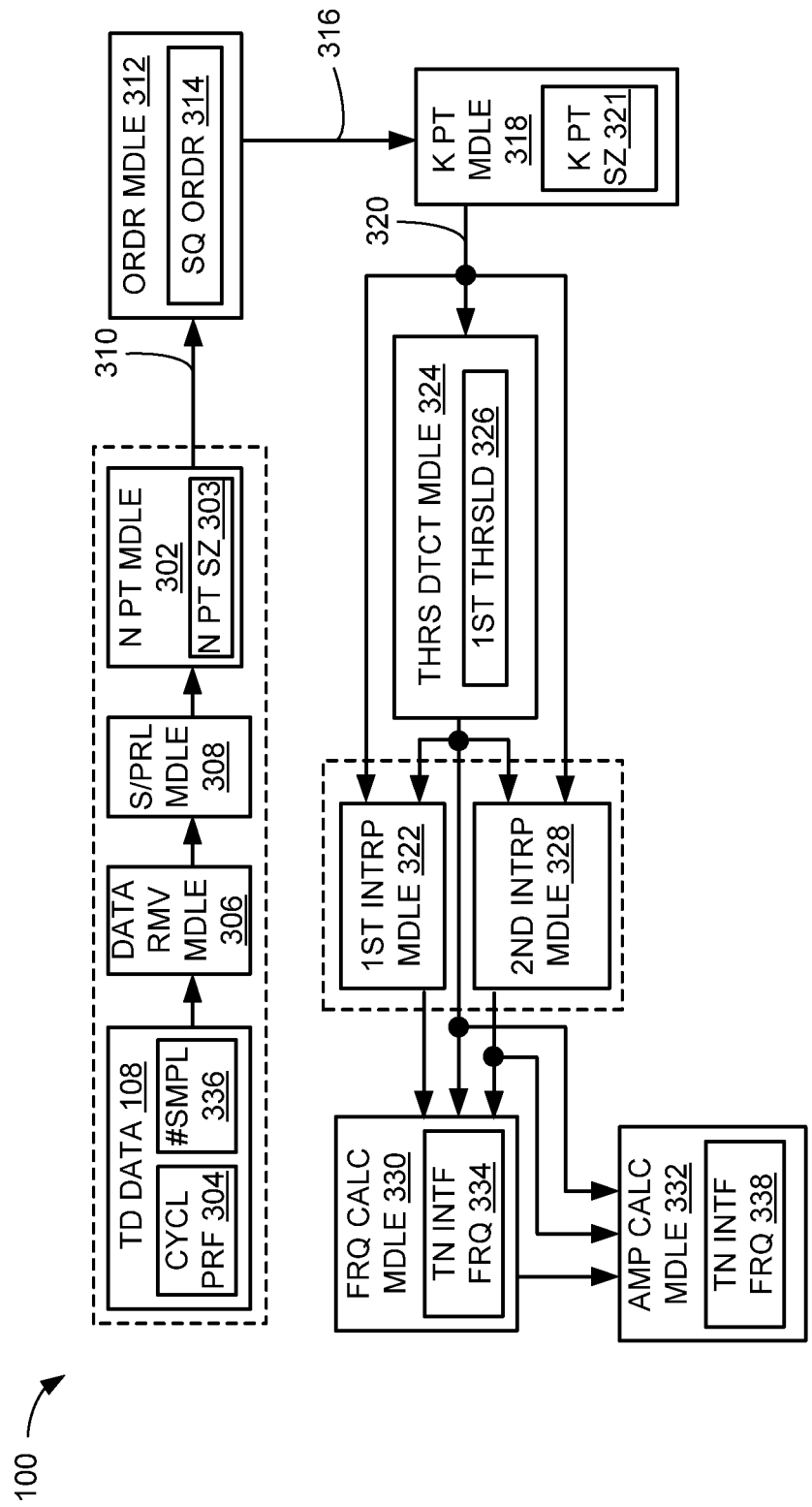
FIG. 3 is a block diagram of the communication system.

Referring now to FIG. 3, therein is shown a block diagram of the communication system 100. The communication system 100 can be used for LTE systems and OFDM systems where frequency domain data is given and nonzero cyclic prefix exists. The communication system 100 can include operations that sequentially estimate parameters of multiple tone signals.

The communication system 100 can include a reliable parameter estimation of tone interference from the series of frequency domain observations. For OFDM (orthogonal frequency-division multiplexing) systems in particular, the energy of tone interference is mostly concentrated at a small number of subcarriers in frequency domain and causes performance degradation even when the tone amplitude is small in time domain.

The mitigation or elimination of this tone interference relies on the accuracy of parameter estimation. Using the peak location of the spectrum of samples, the mean square error for tone frequency estimation can be minimized. Samples of data can be processed by taking discrete Fourier transform (DFT) of the samples. However, taking DFT of the samples can be limited not by the sample size but by the size of DFT.

The communication system 100 includes an operation that improves the reliability of tone parameter estimation when there are more samples available than the size of DFT. The use of frequency domain observations of one DFT block does not yield reliable parameter estimates of tone interference. The communication system 100 includes a method that improves accuracy of estimating tone frequency and amplitude compared to other estimation methods by combining multiple DFT blocks of frequency domain observations.

The communication system 100 can include operations for determining frequency and amplitude estimations of the time-domain data 108 from frequency domain observations. The communication system 100 can process the time-domain data 108 in the time domain.

The time-domain data 108 can be processed with multiple N-point transform modules 302. Each of the N-point transform modules 302 can have an N-point transform size 303, denoted as N. The N-point transform modules 302 are for converting a data sequence of the time-domain data 108 from time domain to frequency domain. For example, the N-point transform modules 302 can include an operation that performs discrete Fourier transform (DFT).

The N-point transform size 303 is defined as a length or a number of points of each of the N-point transform modules 302. The N-point transform size 303 is a counting value greater than or equal to one.

The time-domain data 108 can be processed with K blocks of the N-point transform modules 302, where K is a counting value greater than or equal to two. The time-domain data 108 can have a size of K $(N+N_{CP})$. The time-domain data 108, denoted as y[ ], can be expressed as follows.

$$y[k(N+N_{CP})+n] \qquad\qquad \text{(Equation 1)}$$

"k" represents an index that indicates which of the N-point transform modules 302. "N" represents a size of each of the N-point transform modules 302. NCP represents a length of a portion of the time-domain data 108 that includes a cyclic prefix 304 for eliminating inter-symbol interference (ISI) and inter-carrier interference (ICI). "n" represents an index that indicates which of the samples in each kth block of the N-point transform modules 302.

The communication system 100 can include a data removal module 306 for removing a portion of the time-domain data 108. The data removal module 306 can remove the cyclic prefix 304 from the time-domain data 108. NCP amount of data can be discarded in each block of the time-domain data 108 of size N+NCP. For example, the NCP amount of data can be discarded for every OFDM symbol.

The communication system 100 can include a serial-to-parallel module 308 for converting a serial data sequence of the time-domain data 108 to parallel data. The serial-to-parallel module 308 can de-serialize a serial bitstream of data from the time-domain data 108 to generate the parallel data.

The communication system 100 can include the N-point transform modules 302. Each of the N-point transform modules 302 can generate frequency-domain data 310, which are defined as data sequences converted from a time domain to a frequency domain. Remaining K blocks of the time-domain data 108 of size N can be sequentially processed by the N-point transform modules 302.

Each of the N-point transform modules 302 can generate the frequency-domain data 310 having a size that is equivalent to N data samples. The frequency-domain data 310 can be generated by converting the remaining K blocks of the time-domain data 108 of size N from the time domain to the frequency domain.

The communication system 100 can include K blocks of the N-point transform modules 302. A total of number of data samples processed by the N-point transform modules 302, denoted as L, is a product of K and N.

The communication system 100 can include an order module 312 for selecting the frequency-domain data 310 in a sequential order 314. The sequential order 314 is defined as an order by which K blocks of the frequency-domain data 310 of size N are selected. The order module 312 can sequentially and timely process a bin output of each of the N-point transform modules 302.

A portion of the block diagram can optionally generate the frequency-domain data 310, denoted as $Y_n^k$. The order module 312 can perform time-frequency transpose. The time-frequency transpose can be performed by the order module 312 receiving the frequency-domain data 310 as $(Y_1^1, \ldots, Y_N^1), (Y_1^2, \ldots, Y_N^2), \ldots, (Y_1^K, \ldots, Y_N^K)$ and reordering the frequency-domain data 310 of size NK (i.e. a product of N and K) to generate ordered frequency-domain data 316 as $(Y_1^1, \ldots, Y_1^K), (Y_2^1, \ldots, Y_2^K), \ldots, (Y_N^1, \ldots, Y_N^K)$. The ordered frequency-domain data 316 can be generated by grouping the frequency-domain data 310 into N groups of K blocks, with each of the K blocks having a sequentially increasing order starting with K=1. The ordered frequency-domain data 316 can also be generated by ordering the N groups with a sequentially increasing order starting with N=1.

When approximate locations of tone signals are known, for example, by performing partial search of the system bandwidth or tracking of tone signals already detected, the N-point transform modules 302 can be implemented by the Goertzel algorithms because the output of a limited number of frequency bins is required. This method provides improved complexity reduction, which is not possible with other methods including the Cooley-Tukey FFT algorithm.

The order module 312 can include a memory device for storing multiple blocks of the frequency-domain data 310. The order module 312 can generate the ordered frequency-domain data 316 by selecting one of the blocks of the frequency-domain data 310 based on the sequential order 314.

The sequential order 314 can be predefined to be in any order including increasing. The term "predefined" means that the sequential order 314 is determined prior to the order module 312 is in operation.

For example, let n=0, . . . , N−1, where n is an index indicating which of K blocks of the frequency-domain data 310 of size N is selected by the order module 312. First, the order module 312 can select the frequency-domain data 310 of a first instance of the N-point transform modules 302 when n is zero. Then, the order module 312 can select the frequency-domain data 310 of a second instance of the N-point transform modules 302 when n equals to one.

This process continues with increasing value of n. The order module 312 can select the frequency-domain data 310 of an N−1 instance of the N-point transform modules 302 when n=N−1. After that, the order module 312 can select the frequency-domain data 310 of a first instance of the N-point transform modules 302 after n is reset to zero.

The block diagram can include an additional K-point DFT, with K-point transform modules 318, instead of NK-point DFT. The K-point transform modules 318 are for converting a data sequence from one function of the frequency-domain data 310 to another function of the frequency-domain data 310 to generate K-point data 320.

Each of the K-point transform modules 318 can have a K-point transform size 321, denoted as K. The K-point transform size 321 is defined as a length of or a number of points of each of the K-point transform modules 318.

The K-point transform modules 318 provide not only the fine frequency of tone signal but also reliability in estimation. The K-point transform modules 318 can be operated sequentially to process frequency-domain data in memory.

For example, the K-point transform modules 318 can include an operation that performs discrete Fourier transform (DFT). Also for example, the number of the K-point transform modules 318 can be greater than or equal to one. The purpose of the K-point transform modules 318 is to provide the finer resolution of frequency domain. The number of the K-point transform modules can be any number greater than or equal to one depending on how many of the K-point transform modules are parallelized for this process.

After the parallel data are processed by the N-point transform modules 302, K blocks of the frequency-domain data 310 of size N can be processed by the K-point transform modules 318. If only one of the K-point transform modules 318 is used, K blocks of the ordered frequency-domain data 316 of size N can be sequentially processed by only one instance of the K-point transform modules 318.

Using the order module 312, the K-point transform modules 318 can process an $n^{th}$ bin output of the N-point transform modules 302 ordered in time, denoted as $(Y_n^1, \ldots, Y_n^K)$, to generate the K-point data 320. An N-point DFT output is a vector of N values. The $n^{th}$ bin means the $n^{th}$ output among these N values. In other words, the K-point transform modules 318 can generate the K-point data 320 by processing the frequency-domain data 310 of an $n^{th}$ instance of the N-point transform modules 302, where n indicates which of K blocks of the N-point transform modules 302 is selected based on the sequential order 314.

The communication system 100 can include the order module 312 as the only buffer between the N-point transform modules 302 and the K-point transform modules 318. The communication system 100 does not require additional NK complex twiddle factor multiplication.

Because of the combination of the N-point transform modules 302 and the K-point transform modules 318, output of the K-point transform modules 318 can have a two-dimensional structure. The use of properly designed two-dimensional interpolator is a key feature to take advantage of the two dimensional structure of the output of the K-point transform modules 318 and to obtain the performance close to the theoretical limit. The tone frequency interpolation operation that is subsequently described is an example of proper design of this two-dimensional interpolator.

The communication system 100 can have only the processing delay of the K-point transform modules 318 without requiring an additional input buffer used in a system that applies the Cooley-Tukey FFT algorithm and breaks down the large DFT. This difference in delays can be critical if the system needs to collect a large number of samples, for example, 10 milliseconds (msec) for 1 frame (or 10 subframes), for example, in LTE systems.

The telecommunication system 100 can include a first interpolation module 322. The first interpolation module 322 can interpolate ($\tilde{Y}_{\tilde{n}-1,\tilde{k}}$, $\tilde{Y}_{\tilde{n},\tilde{k}}$, and $\tilde{Y}_{\tilde{n}+1,\tilde{k}}$). The first interpolation module 322 processes ($\tilde{Y}_{\tilde{n}-1,\tilde{k}}$, $\tilde{Y}_{\tilde{n},\tilde{k}}$, and $\tilde{Y}_{\tilde{n}+1,\tilde{k}}$) and provides a coarse frequency estimate.

The communication system 100 can include a threshold detection module 324. The threshold detection module 324 can monitor the K-point data 320, denoted as $\tilde{Y}_{\tilde{n},\tilde{k}}$. The threshold detection module 324 can compare the magnitude of $\tilde{Y}_{\tilde{n},\tilde{k}}$, denoted as $|\tilde{Y}_{n,k}|$, to a first threshold 326, which is defined as a predefined numerical value. The term "predefined" means that the first threshold 326 is defined prior to the threshold detection module 324 is in operation. If $|\tilde{Y}_{n,k}|$ is above the first threshold 326, the threshold detection module 324 can store neighbors of $\tilde{Y}_{\tilde{n},\tilde{k}}$, which are denoted as $\tilde{Y}_{\tilde{n},\tilde{k}-1}$, $\tilde{Y}_{\tilde{n},\tilde{k}+1}$, $\tilde{Y}_{\tilde{n}-1,\tilde{k}}$, and $\tilde{Y}_{\tilde{n}+1,\tilde{k}}$.

The telecommunication system 100 can include a second interpolation module 328. The second interpolation module 328 can interpolate ($\tilde{Y}_{\tilde{n},\tilde{k}-1}$, $\tilde{Y}_{\tilde{n},\tilde{k}}$, $\tilde{Y}_{\tilde{n},\tilde{k}+1}$). The second interpolation module 328 processes ($\tilde{Y}_{\tilde{n},\tilde{k}-1}$, $\tilde{Y}_{\tilde{n},\tilde{k}}$, $\tilde{Y}_{\tilde{n},\tilde{k}+1}$) and provides a fine frequency estimate.

The communication system 100 can include a frequency calculation module 330 and an amplitude calculation module 332. The frequency calculation module 330 is for generating a tone interference frequency 334, which is defined as a rate at which a noise signal in the time-domain data 108 oscillates. The noise signal can cause tone interference in the time-domain data 108.

The tone interference frequency 334 can be generated or determined with an operation that utilizes multiple blocks of frequency domain observations. The tone interference frequency 334 can be generated based on K blocks of the N-point transform modules 302 of size N.

The N-point transform modules 302 can convert a number of data samples 336 of the time-domain data 108. The number of the data samples 336 is denoted as L. The number of the data samples 336 is equal to a product of a number of blocks, denoted as K, of the N-point transform modules 302 and a size, denoted as N, of each of the N-point transform modules 302. A number of the data samples 336 is greater than a size of each of the N-point transform modules 302.

The amplitude calculation module 332 is for generating or determining a tone interference amplitude 338, which is defined as a magnitude of a noise signal in the time-domain data 108. The frequency calculation module 330 and the amplitude calculation module 332 will be further described in subsequent sections.

It has been discovered that using only one block of the K-point transform modules 318 provides improved performance since other systems have performance limitations by requiring additional memory that results in increased processing time.

Each of the N-point transform modules 302, the data removal module 306, the serial-to-parallel module 308, the order module 312, the K-point transform modules 318, the first interpolation module 322, the threshold detection module 324, the second interpolation module 328, the frequency calculation module 330, and the amplitude calculation module 332 can be implemented in the first station 102 of FIG. 1, the second station 104 of FIG. 1, or a combination thereof. For example, each of the N-point transform modules 302, the data removal module 306, the serial-to-parallel module 308, the order module 312, the K-point transform modules 318, the first interpolation module 322, the threshold detection module 324, the second interpolation module 328, the frequency calculation module 330, and the amplitude calculation module 332 can be implemented with the first control unit 212 of FIG. 2, the first storage unit 214 of FIG. 2, the first communication unit 216 of FIG. 2, the first user interface 218 of FIG. 2, or a combination thereof.

The serial-to-parallel module 308 can be coupled to the data removal module 306 and the N-point transform modules 302. The order module 312 can be coupled to the N-point transform modules 302 and the K-point transform modules 318. The K-point transform modules 318 can be coupled to the first interpolation module 322, the threshold detection module 324, and the second interpolation module 328. The first interpolation module 322 can be coupled to the frequency calculation module 330.

The threshold detection module 324 can be coupled to the first interpolation module 322, the second interpolation module 328, the frequency calculation module 330, and the amplitude calculation module 332. The second interpolation module 328 can be coupled to the amplitude calculation module 332. The frequency calculation module 330 can be coupled to the amplitude calculation module 332.

It has been discovered that the order module 312 having the sequential order 314 for generating the ordered frequency-domain data 316 provides improved operation by sequentially and timely process a bin output of each of the N-point transform modules 302.

It has also been discovered that the K-point transform modules 318 provides improved reliability by taking DFT again over DFT bin output of each of the N-point transform modules 302 in order to obtain reliable statistics.

Figure 4:
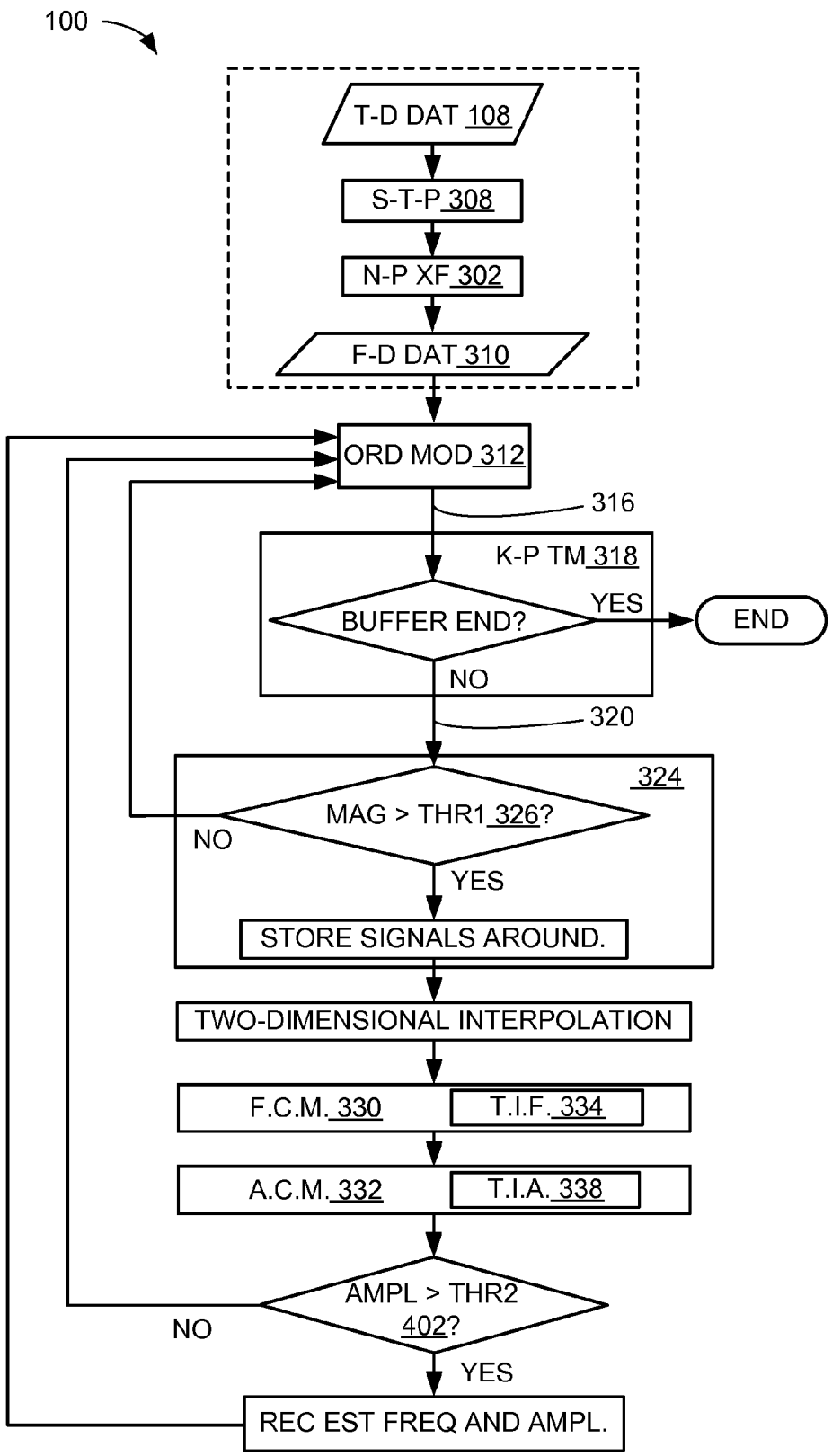
FIG. 4 is a control flow of the communication system.

Referring now to FIG. 4, therein is shown a control flow of the communication system 100. The control flow depicts an operation of tone detection and parameter estimation.

The communication system 100 can include an operation to process the time-domain data 108 of size K×(N+$N_{CP}$) with the N-point transform modules 302, each of size N, and the K-point transform modules 318, each of size K. The N-point transform modules 302 can process data from the serial-to-parallel module 308. An $N_{CP}$ amount of the time-domain data 108 can be discarded in each block of the time-domain data 108 of size N+$N_{CP}$.

As shown in a dash rectangle, the frequency-domain data 310 can be transformed from a time domain to a frequency domain. The frequency-domain data 310 can optionally be generated when the communication system 100 is used in a communication system (not shown) including an orthogonal frequency-division multiplexing (OFDM) system.

Remaining K blocks of the time-domain data 108 of size N can be sequentially processed by the N-point transform modules 302. The frequency-domain data 310 generated by the N-point transform modules 302 can be stored by the order module 312. The frequency-domain data 310 can be stored into a buffer or a memory of the order module 312.

After being processed by the N-point transform modules 302, K blocks of the frequency-domain data 310 of size N can be processed by the K-point transform modules 318. The K-point transform modules 318 can process an $n^{th}$ bin output of the N-point transform modules 302 ordered in time until the end of the buffer is reached. If only one of the K-point transform modules 318 is used, N blocks of data of size K will be sequentially processed by the one of the K-point transform modules 318. When the total number of data in the buffer is NK, the K-point transform modules 318 can be used N times to process the data of size NK.

While the K-point transform modules 318 are in operation, the threshold detection module 324 can monitor the magnitude of the K-point data 320. If the magnitude of the K-point data 320 is above the first threshold 326, values of neighbors of the K-point data 320 can be stored by the K-point data 320. The neighbors of the K-point data 320 can include signals that are around or adjacent the K-point data 320. The neighbors of the K-point data 320 can include $\tilde{Y}_{\hat{n},\hat{k}-1}, \tilde{Y}_{\hat{n},\hat{k}+1}, \tilde{Y}_{\hat{n}-1,\hat{k}}$, and $\tilde{Y}_{\hat{n}+1,\hat{k}}$. Two-dimensional interpolation can be performed with the first interpolation module 322 of FIG. 3 and the second interpolation module 328 of FIG. 3 after the K-point transform modules 318 and the threshold detection module 324 are performed.

After the K-point transform modules 318 process all the ordered frequency-domain data 316, the threshold detection module 324 picks or selects the K-point data 320 with the maximum magnitude. Then, the frequency calculation module 330 and the amplitude calculation module 332 can estimate the tone interference frequency 334 and the tone interference amplitude 338, respectively, with the peak of the K-point data 320 with the maximum magnitude and magnitudes of the neighbors of the K-point data 320. The K-point data 320 with the maximum magnitude can be determined as follows.

$$(\hat{n},\hat{k}) = \mathrm{argmax}_{n,k} |\tilde{Y}_{n,k}| \quad \text{(Equation 2)}$$

If the tone interference amplitude 338 is estimated to be above a second threshold 402 by the amplitude calculation module 332, the amplitude calculation module 332 can declare or indicate that the communication system 100 finds a tone signal with estimated frequency and amplitude values. The tone interference frequency 334 and the tone interference amplitude 338 can be recorded by the frequency calculation module 330 and the amplitude calculation module 332, respectively, when the tone interference amplitude 338 is above the second threshold 402. If there exist additional stored samples of the time-domain data 108 excluding the neighbors of the K-point data 320 with a peak magnitude, the steps described above can be repeated to find additional tone interferences until all tones are found.

The communication system 100 can optionally include an overlap of the time-domain data 108 as input data for the N-point transform modules 302. In this case, the input data includes a portion at the end of the previous block of the time-domain data 108 and a portion at the beginning of the current block of the time-domain data 108, where the previous block is received before the current block. The communication system 100 can optionally include an operation that uses the Goertzel algorithm or any other method producing a limited number of frequency bin outputs instead of using the N-point transform modules 302.

Combination of multiple blocks of frequency domain observations to improve the quality of estimation is proposed, which effectively lowers the CR bound by increasing the sample size. A proposed estimator in the present invention includes the ML operation. The proposed estimator of obtaining coarse frequency estimation and interpolating processed samples is significantly different from that of traditional DFT based estimators because the proposed estimator processes frequency domain observations instead of time domain observations. To the best of our knowledge, the problem of processing multiple blocks of frequency domain observations for tone parameter estimation has not been studied yet.

The present invention can be most suitable for OFDM systems, where multiple blocks of frequency domain observations can be provided. However, the present invention can be applied to a system that only provides time domain signal if additional DFT is performed. This still reduces considerable computational complexity while saving huge processing delay for streaming data compared with traditional DFT based estimators.

The present invention performs DFT over a sequence of each frequency component collected over multiple blocks of frequency domain observations to obtain reliable statistics instead of directly interpolating one block of frequency domain observations. This frequency domain DFT provides not only the fine frequency of the tone signal but also improved reliability in estimation.

However, we focus on developing an algorithm to process this DFT output since it is different from the DFT output of time domain observations. In particular, a naive combination of coarse and fine tone frequency does not provide a good estimate of tone frequency because of ambiguity and non-negligible probability of coarse frequency decision error.

The present invention includes an operation that uses a two dimensional interpolator, including the first interpolation module 322 and the second interpolation module 328, to combine the fine frequency and the coarse frequency. The present invention can be used for OFDM systems even when nonzero cyclic prefix exists. Moreover, the parameters of multiple tone signals can be estimated sequentially if tone signals are separated enough in frequency.

Figure 5:
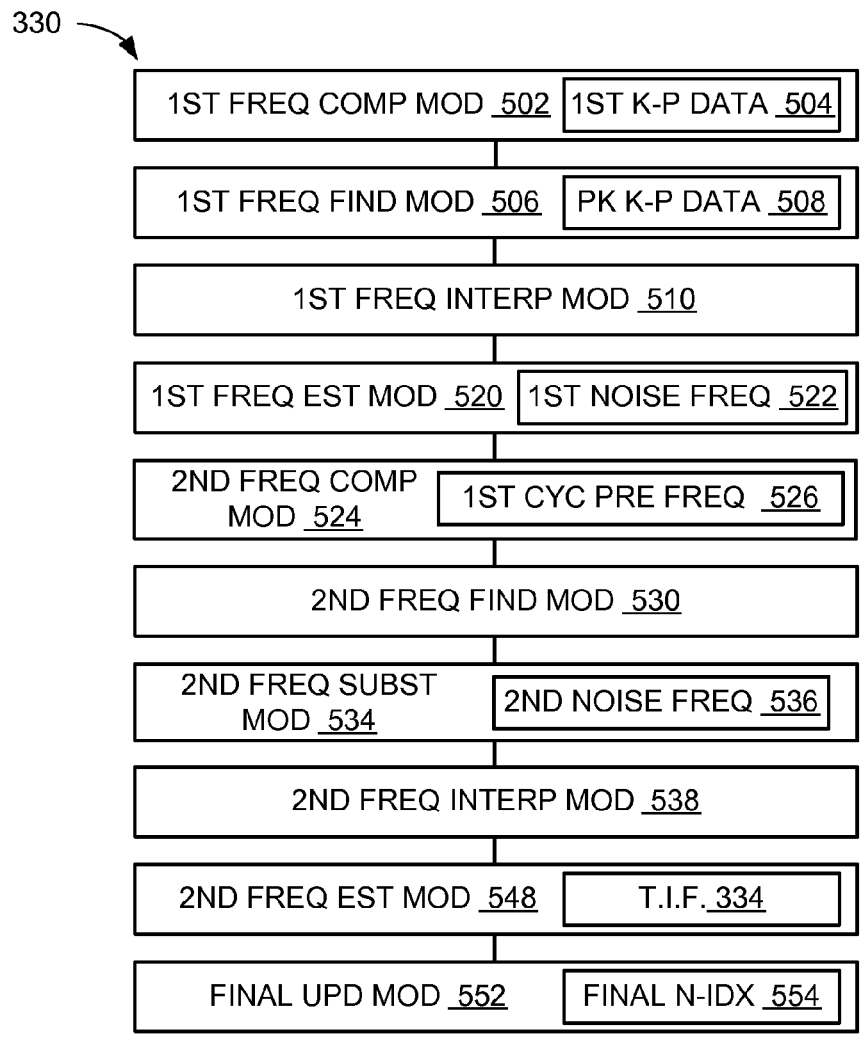
FIG. 5 is an example of a control flow of the frequency calculation module.

Referring now to FIG. 5, therein is shown an example of a control flow of the frequency calculation module 330. The frequency calculation module 330 can include an operation for a DFT-based tone frequency estimation.

The frequency calculation module 330 can include a first frequency compute module 502 for calculating a first frequency K-point data 504, denoted as $\tilde{Y}_{n,k}$. Let there be K blocks of frequency-domain observations by using K blocks of the N-point transform modules 302 of FIG. 3. K blocks of the frequency-domain observations can be expressed as follows.

$$y_{kN+n} = x_{kN+n} + w_{kN+n} \quad \text{(Equation 3)}$$

"k" represents a block index having a value of k=0, ..., K−1. "n" represents an output index of the K-point data 320 of FIG. 3 from each of the N-point transform modules 302. N can have a range of n=0, ..., N−1. $Y_n^k, X_n^k$, and $w_n^k$ represent a $k^{th}$ block of outputs of the N-point transform modules 302 of $y_{kN+n}, x_{kN+n}$, and $w_{kN+n}$, respectively, where n=0, ..., N−1. "x" represents the original signal from a transmitter. "w" represents a noise signal. "y" represents the K-point data 320.

The first frequency K-point data 504 can be calculated by operating the K-point transform modules 318 of FIG. 3 to perform a K-point DFT operation for the $n^{th}$ output of the N-point transform modules 302 over K blocks. There can be N blocks or a single block of the K-point transform modules 318 for generating the first frequency K-point data 504. The first frequency K-point data 504 can be calculated as follows.

$$\tilde{Y}_{n,k} = \frac{1}{\sqrt{K}} \sum_{k'=0}^{K-1} Y_n^{k'} \exp\left(-j\frac{2\pi k'}{K}k\right) \quad \text{(Equation 4)}$$

$$= \frac{1}{\sqrt{K}} \sum_{k'=0}^{K-1} (X_n^{k'} + W_n^{k'}) \exp\left(-j\frac{2\pi k'}{K}k\right)$$

$$= \tilde{X}_{n,k} + \tilde{w}_{n,k}$$

"exp" represents 'e', which is base of the natural logarithm.

It has been discovered that using the K-point transform modules 318 in the first frequency compute module 502 provides an advantage of improved reliability on the frequency estimate.

The frequency calculation module 330 can include a first frequency find module 506 for determining a peak K-point data 508. The peak K-point data 508 is defined as the first frequency K-point data 504 with the highest magnitude among the data values stored over L data samples. The peak K-point data 508 can be calculated as follows.

$$(\hat{n},\hat{k}) = \mathrm{argmax}_{n,k} |\tilde{Y}_{n,k}| \quad \text{(Equation 5)}$$

"$\hat{n}$" and "$\hat{k}$" represent the $n^{th}$ index of each of the N-point transform modules 302 and the $k^{th}$ block of outputs of the N-point transform modules 302, respectively. "argmax$_{n,k}$|$\tilde{Y}_{n,k}$|" represents a function that returns values of n and k of the first frequency K-point data 504 with the highest magnitude among the data values stored over L data samples. "($\hat{n}$, $\hat{k}$)" identifies the peak location of the spectrum of samples to minimize the mean square error for the tone frequency estimation.

The frequency calculation module 330 can include a first frequency interpolate module 510. The first frequency interpolate module 510 can be used to perform interpolation ($\tilde{Y}_{\hat{n}-1,\hat{k}}$, $\tilde{Y}_{\hat{n},\hat{k}}$, $\tilde{Y}_{\hat{n}+1,\hat{k}}$) to obtain a coarse estimate $\hat{\omega}_{F,1}$ using any interpolation operation. The purpose of the first frequency interpolate module 510 is to determine the coarse estimate $\hat{\omega}_{F,1}$ in order to find a coarse frequency estimate $\hat{\omega}_{T,1}$, which will be subsequently described. For example, the interpolation operation can preferably be performed as follows.

$$\text{Computing } R[m] = Re(\tilde{Y}_{\hat{n}+m,\hat{k}} \tilde{Y}^*_{\hat{n},\hat{k}}) \quad \text{(Equation 6)}$$

$$\text{Computing } \gamma = \frac{R[-1] - R[1]}{2R[0] + R[-1] + R[1]} \quad \text{(Equation 7)}$$

$$\text{Obtaining } \hat{\omega}_{F,1} = \frac{2\pi}{N} \frac{\sqrt{1+8\gamma^2} - 1}{4\gamma} \quad \text{(Equation 8)}$$

In equation 6, "m" represents a relative location or position of $\tilde{Y}_{\hat{n}+m,\hat{k}}$ with respect to $\tilde{Y}_{\hat{n}+\hat{k}}$. For example, "m" can represent a number including 0, +1, or −1. The function "$\hat{\omega}_{F,1}$" is the first fine frequency estimate. The subscript "1" is an index to distinguish this fine frequency estimate from other fine frequency estimates in later steps, which will be subsequently described.

The frequency calculation module 330 can include a first frequency estimate module 520 for determining a first noise frequency 522, denoted as $\hat{\omega}_{T,1}$. The first noise frequency 522 is defined as a frequency of a noise signal that causes tone interference. The first noise frequency 522 can be calculated based on a coarse frequency and the fine frequency. The first noise frequency 522 can be estimated as follows.

$$\hat{\omega}_{T,1} = 2\pi \frac{\hat{n}}{N} + \hat{\omega}_{F,1} \quad \text{(Equation 9)}$$

"$2\pi \frac{\hat{n}}{N}$"

represents a coarse frequency.

There can be many degrees of frequency estimates. A frequency estimate of $$2\pi \frac{\hat{n}}{N}$$

can represent the most crude estimate. For example, the quality of frequency estimate can improve in the order of frequency estimates of $$2\pi \frac{\hat{n}}{N} \to \hat{\omega}_{T,1} \to \hat{\omega}_{T,2} \to \hat{\omega}_{T,3},$$

with a frequency estimate of $\hat{\omega}_{T,3}$ representing the best frequency estimate. The term "coarse estimate of $\hat{\omega}_{T,1}$" means that a frequency estimate of $\hat{\omega}_{T,1}$ is more coarse than a frequency estimate of $\hat{\omega}_{T,3}$. Frequency estimates of $\hat{\omega}_{T,2}$ and $\hat{\omega}_{T,3}$ will be subsequently described.

In some OFDM systems, length $N_{CP}$ can be non-constant or irregular. In this case, the final tone frequency estimate can be obtained or determined from equation 9 instead of equation 16, which will be subsequently described. Performing more processing steps after equation 9 for the tone frequency estimation in this case can lead to unreliable frequency estimate.

The frequency calculation module 330 can include a second frequency compute module 524 for generating a first cyclic prefix frequency 526. The first cyclic prefix frequency 526 can be computed as follows.

$$\hat{n}_{CP} = \mathrm{floor}\left(\hat{\omega}_{T,1} \frac{N + N_{CP}}{2\pi}\right) \quad \text{(Equation 10)}$$

$$\hat{\omega}_{F,CP,1} = \hat{\omega}_{T,1} - 2\pi \frac{\hat{n}_{CP}}{N + N_{CP}} \quad \text{(Equation 11)}$$

From equation 9, the quality of frequency estimate can be iteratively improved. The original $\hat{n}$ is a noisy estimate of the peak. However, using the frequency estimate in equation 9, more reliable peak estimate of $\hat{n}$, which is $\hat{n}_{CP}$, can be obtained or determined. Thus, $$2\pi \frac{\hat{n}_{CP}}{N + N_{CP}}$$

is an improved coarse frequency estimation.

The frequency calculation module 330 can include a second frequency find module 530. The second frequency find module 530 can determine an improved fine frequency estimate using the result of equation 9 as follows.

$$\hat{\omega}_{F,CP,2} = \mathrm{argmin}_{\omega \in B} |\omega - \hat{\omega}_{F,CP,1}|$$

where $$B = \left\{ 2\pi \frac{\hat{k} - K}{K(N + N_{CP})}, 2\pi \frac{\hat{k}}{K(N + N_{CP})}, 2\pi \frac{\hat{k} + K}{K(N + N_{CP})} \right\}.$$

The fine frequency estimate can be improved more using the fact that the relative location of $\hat{k}$ with respect to $\hat{n}_{CP}$ is most likely limited by the set B above.

The frequency calculation module 330 can include a second frequency substitute module 534 for calculating a second noise frequency 536, denoted as $\hat{\omega}_{T,2}$. The second frequency substitute module 534 can substitute $\hat{\omega}_{F,CP,1}$ in equation 10 with $\hat{\omega}_{F,CP,2}$. The second noise frequency 536 can be estimated as follows.

$$\hat{\omega}_{T,2} = 2\pi \frac{\hat{n}_{CP}}{N + N_{CP}} + \hat{\omega}_{F,CP,2} \qquad \text{(Equation 12)}$$

The frequency calculation module 330 can include a second frequency interpolate module 538. The second frequency interpolate module 538 can be used to perform interpolation ($\tilde{Y}_{\hat{n},\hat{k}-1}, \tilde{Y}_{\hat{n},\hat{k}}, \tilde{Y}_{\hat{n},\hat{k}+1}$) around $\hat{k}$ using any interpolation operation. For example, the interpolation operation can preferably be performed as follows.

$$\text{Compute: } R'[m] = Re\left(\tilde{Y}_{\hat{n},\hat{k}+m} \tilde{Y}_{\hat{n},\hat{k}}^*\right) \qquad \text{(Equation 13)}$$

$$\text{Compute: } \gamma' = \frac{R'[-1] - R'[1]}{2R'[0] + R'[-1] + R'[1]} \qquad \text{(Equation 14)}$$

$$\text{Obtain: } \hat{\omega}_{F,CP,3} = \frac{2\pi}{K(N + N_{CP})} \frac{\sqrt{1 + 8\gamma'^2} - 1}{4\gamma'} \qquad \text{(Equation 15)}$$

The second frequency interpolate module 538 provides additional information obtained or determined from interpolation along $\hat{k}$ because a previous interpolation described above is based on ($\tilde{Y}_{\hat{n}-1,\hat{k}}, \tilde{Y}_{\hat{n},\hat{k}}, \tilde{Y}_{\hat{n}+1,\hat{k}}$) along $\hat{n}$. This interpolation on ($\tilde{Y}_{\hat{n},\hat{k}-1}, \tilde{Y}_{\hat{n},\hat{k}}, \tilde{Y}_{\hat{n},\hat{k}+1}$) will further improve the quality of frequency estimate.

In equation 13, "m" represents a relative location or position of $\tilde{Y}_{\hat{n},\hat{k}+m}$ with respect to $\tilde{Y}_{\hat{n},\hat{k}}$. For example, "m" can represent a number including 0, +1, or -1. The function "$\hat{\omega}_{F,1}$" is the first fine frequency estimate. The function "$\hat{\omega}_{F,CP,3}$" is the final fine frequency estimate with respect to $\hat{\omega}_{T,2}$. The subscript "3" is an index to distinguish this fine frequency estimate from other fine frequency estimate in the previous steps.

The frequency calculation module 330 can include a second frequency estimate module 548 for determining the tone interference frequency 334, denoted as $\hat{\omega}_{T,3}$. The tone interference frequency 334 can be calculated based on a coarse frequency and the fine frequency. The tone interference frequency 334 can be estimated as follows.

$$\hat{\omega}_{T,3} = \hat{\omega}_{T,2} + \hat{\omega}_{F,CP,3} \qquad \text{(Equation 16)}$$

The tone frequency estimation can depend on the target frequency resolution. When frequency estimate with the best quality is selected with penalty of additional complexity, tone frequency estimation can be determined based on equation 16. Otherwise, tone frequency estimation can be determined based on equation 9 or 12.

The communication system 100 of FIG. 1 can optionally include a final update module 552 for generating a final n-index 554. The final update module 552 can generate the final n-index 554 based on equation 5 with $\hat{n}$ replaced by the final n-index 554 and $\tilde{Y}_{\hat{n},\hat{k}}$ replaced by $\hat{\omega}_{T,3}$ as the final estimate of the tone frequency estimation.

This operation can be used no matter whether $N_{CP}=0$ or $N_{CP}>0$. Note that the size of candidate set B should be adjusted according to $N_{CP}$ length while the suggested candidate set will cover all possibility for $N_{CP}=N$. One more advantage of this approach is that we need to perform K-point DFT of $Y_n^k$ only around frequency domain bin index n of our interest if we know approximately where the tone will appear.

While we only focus on the parameter estimation of single-tone signals, this technique can be easily applied to multiple-tone estimation. After tone parameter estimation using a peak and its neighbor, the system can find the next peak excluding the previous peaks and their neighbors and keep repeating the same procedure.

To take advantage of a large number of data samples of the time-domain data 108 of FIG. 1, an L-point DFT of size L can be used but can be restrictive in a number of situations. For L=K×N, results of K blocks of the N-point transform modules 302 can be combined.

Each of the first frequency compute module 502, the first frequency find module 506, the first frequency interpolate module 510, the first frequency estimate module 520, the second frequency compute module 524, the second frequency find module 530, the second frequency substitute module 534, the second frequency interpolate module 538, the second frequency estimate module 548, and the final update module 552 can be implemented in the first station 102 of FIG. 1, the second station 104 of FIG. 1, or a combination thereof. For example, each of the first frequency compute module 502, the first frequency find module 506, the first frequency interpolate module 510, the first frequency estimate module 520, the second frequency compute module 524, the second frequency find module 530, the second frequency substitute module 534, the second frequency interpolate module 538, the second frequency estimate module 548, and the final update module 552 can be implemented with the first control unit 212 of FIG. 2, the first storage unit 214 of FIG. 2, the first communication unit 216 of FIG. 2, the first user interface 218 of FIG. 2, or a combination thereof.

The first frequency compute module 502 can be coupled to the first frequency find module 506. The first frequency find module 506 can be coupled to the first frequency interpolate module 510. The first frequency interpolate module 510 can be coupled to the first frequency estimate module 520. The first frequency estimate module 520 can be coupled to the second frequency compute module 524. The second frequency compute module 524 can be coupled to the second frequency find module 530.

The second frequency find module 530 can be coupled to the second frequency substitute module 534. The second frequency substitute module 534 can be coupled to the second frequency interpolate module 538. The second frequency interpolate module 538 can be coupled to the second frequency estimate module 548. The second frequency estimate module 548 can be coupled to the final update module 552.

It has been discovered that combining multiple blocks of the N-point transform modules 302 provides improved quality of estimation thereby effectively lowering the fundamental limit of estimation. It is understood that there is no known method or prior invention processing multiple of the N-point transform modules 302 to obtain reliable detection and estimation of tone signals.

It has also been discovered that the tone interference frequency 334, denoted as $\hat{\omega}_{T,3}$, provides improved calculation of tone interference frequency by using interpolators to combine the fine frequency ($\hat{\omega}_{F,CP,3}$) and the coarse frequency ($\hat{\omega}_{T,2}$).

It has further been discovered that the second frequency interpolate module 538 provides improved performance since the second frequency interpolate module 538 is necessary to perform interpolation over k in order to achieve the performance close to the CR bound.

Figure 6:
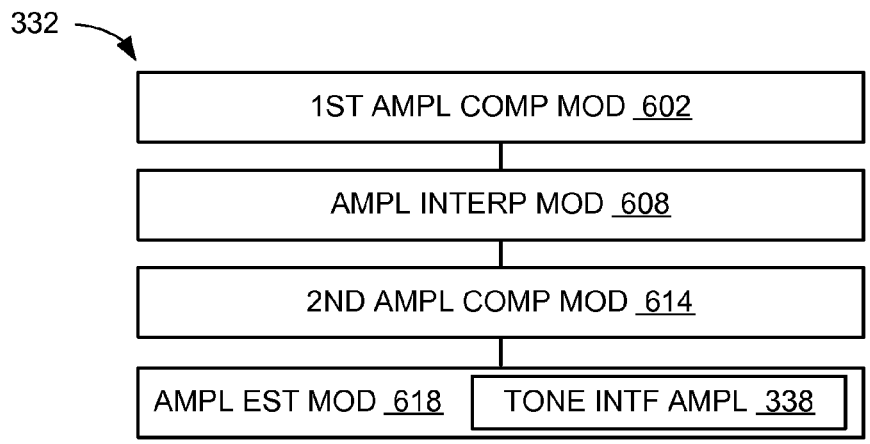
FIG. 6 is an example of a control flow of the amplitude calculation module.

Referring now to FIG. 6, therein is shown an example of a control flow of the amplitude calculation module 332. The amplitude calculation module 332 can include an operation that performs a DFT-based tone amplitude estimation.

The amplitude calculation module 332 can include a first amplitude compute module 602.

$$\text{Compute: } \Delta_1 = \hat{\omega}_{F,CP,3} \frac{K(N+N_{CP})}{2\pi} \quad \text{(Equation 17)}$$

$$= \frac{\sqrt{1+8\gamma'^2}-1}{4\gamma'}$$

$$\alpha = \text{sign}(\Delta_1) \quad \text{(Equation 18)}$$

Where $\gamma'$ and $\hat{\omega}_{F,CP,3}$ are calculated by equations 14 and 15, respectively.

The relative location $\Delta_1$ with respect to $\hat{k}$ can be computed. This quantity can be used to interpolate $\tilde{Y}_{\hat{n},\hat{k}}$ and $\tilde{Y}_{\hat{n},\hat{k}+\alpha}$ for amplitude estimation. sign ($\Delta_1$) returns 1 if $\Delta_1$ is positive, −1 if $\Delta_1$ is negative, and zero if $\Delta_1$ is zero.

The amplitude calculation module 332 can include an amplitude interpolate module 608.

$$\text{If } \alpha=0, A_{FD}=\tilde{Y}_{\hat{n},\hat{k}}\sqrt{K} \quad \text{(Equation 19)}$$

Otherwise, interpolate as follows.

$$Y_w = (1-|\Delta_1|)\tilde{Y}_{\hat{n},\hat{k}} - |\Delta_1|\tilde{Y}_{\hat{n},\hat{k}+\alpha} \quad \text{(Equation 20)}$$

$$A_{FD} = \frac{(1-|\Delta_1|)}{(1-2|\Delta_1|+\Delta_1^2)}\left|Y_w \frac{\sqrt{K}\sin(\pi\Delta_1/K)}{\sin(\pi\Delta_1)}\right| \quad \text{(Equation 21)}$$

In equation 21, $A_{FD}$ is an amplitude estimate only using interpolation along $\hat{k}$. $Y_w$ is an intermediate step for amplitude estimation. Interpolation can be performed for the tone amplitude estimation in equations 20 and 21. Although equations 20 and 21 are represented preferably as an exemplary interpolation method of determining or obtaining $A_{FD}$, there can be other interpolation techniques for obtaining $A_{FD}$.

The amplitude calculation module 332 can include a second amplitude compute module 614.

$$\Delta_2 = \hat{\omega}_{T,3}\frac{N}{2\pi} - \hat{n} \quad \text{(Equation 22)}$$

The second amplitude compute module 614 can compute $\Delta_2$ using the final estimate $\hat{\omega}_{T,3}$ in equation 19. The relative location $\Delta_2$ with respect to $\hat{n}$ can be computed. This quantity can be used to adjust $A_{FD}$ for amplitude estimation.

The amplitude calculation module 332 can include an amplitude estimate module 618 for calculating the tone interference amplitude 338, denoted as $\hat{a}$, as follows.

$$\hat{a} = \left|A_{FD}\frac{\sqrt{N}\sin(\pi\Delta_2/N)}{\sin(\pi\Delta_2)}\right| \quad \text{(Equation 23)}$$

Interpolation can be performed using equation 23 for the tone amplitude estimation algorithm instead of only using the peak. In other words, more reliable peak estimate of $\hat{n}$ can be used instead. For example, $\hat{n}_{CP}$ or the final n-index 554 of FIG. 5 can be used.

The amplitude calculation module 332 can optionally apply an updated value of the final n-index 554. The amplitude interpolate module 608 can be operated by optionally applying the final n-index 554 for equations 19-20. The second amplitude compute module 614 can be operated by optionally applying the final n-index 554 for equation 22.

In the calculation above, approximations that can be used include $\sin(\pi\Delta/K) \approx \pi\Delta/K$ for large K and $\sin(\pi\Delta/N) \approx \pi\Delta/N$ for large N. Note that this amplitude estimation operation not only relies on the tone frequency estimation operation previously described but also uses its frequency estimate. The operation can be based on the following analysis and interpolation techniques.

$\tilde{X}_{n,k}$ has the following two dimensional structure.

$$\tilde{X}_{n,k} = X_n^0 \frac{1}{\sqrt{K}} \sum_{k'=0}^{K-1} \exp(jk'N\omega_F)\exp\left(-j\frac{2\pi k'}{K}k\right) \quad \text{(Equation 24)}$$

$$= ae^{j\theta}\frac{1}{\sqrt{N}}\exp(j(N-1)\omega_d/2)\frac{\sin(N\omega_d/2)}{\sin(\omega_d/2)} \times$$

$$\frac{1}{\sqrt{K}}\exp(j(K-1)\omega_d'/2)\frac{\sin(K\omega_d'/2)}{\sin(\omega_d'/2)}$$

where $$\omega_d = \omega_T - 2\pi\frac{n}{N} \text{ and } \omega_d' = N\omega_T - 2\pi\frac{n}{N} = N\omega_F - 2\pi\frac{k}{K}.$$

Based on equation 24, it is concluded that the tone amplitude can be estimated by interpolation of the signal along $\hat{k}$ and along $\hat{n}$.

The final step of the amplitude estimation operation can be further improved by using a weighted average of the peak and its larger neighborhood instead of just using the peak. For equation 23, information embedded in $\tilde{Y}_{\hat{n}-1,\hat{k}}$ and $\tilde{Y}_{\hat{n}+1,\hat{k}}$ can be used instead of adjusting interpolation result of interpolation for $\tilde{Y}_{\hat{n},\hat{k}}$ and $\tilde{Y}_{\hat{n},\hat{k}+\alpha}$, where $\alpha$ can be either +1 or −1. When $\alpha=0$, interpolation is not needed and only $\tilde{Y}_{\hat{n},\hat{k}}$ can be used.

Each of the first amplitude compute module 602, the amplitude interpolate module 608, the second amplitude compute module 614, and the amplitude estimate module 618 can be implemented in the first station 102 of FIG. 1, the second station 104 of FIG. 1, or a combination thereof. For example, each of the first amplitude compute module 602, the amplitude interpolate module 608, the second amplitude compute module 614, and the amplitude estimate module 618 can be implemented with the first control unit 212 of FIG. 2, the first storage unit 214 of FIG. 2, the first communication unit 216 of FIG. 2, the first user interface 218 of FIG. 2, or a combination thereof.

The first amplitude compute module 602 can be coupled to the amplitude interpolate module 608. The amplitude interpolate module 608 can be coupled to the second amplitude compute module 614. The second amplitude compute module 614 can be coupled to the amplitude estimate module 618.

It has been discovered that the first amplitude compute module 602 and the second amplitude compute module 614 provide improved accuracy for the amplitude estimate module 618 to effectively determine the tone interference amplitude 338 resulting in reduced root mean square amplitude errors that approach the CR bound.

Figure 7:
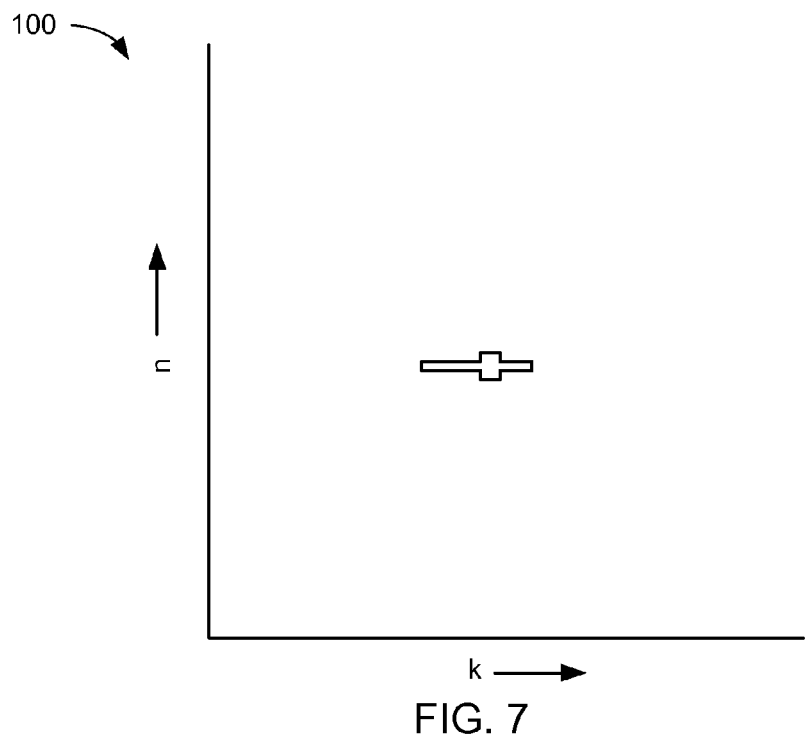
FIG. 7 is an example of a graph of tone energy of the communication system.

Referring now to FIG. 7, therein is shown an example of a graph of tone energy of the communication system 100. The graph depicts an exemplary magnitude of the first frequency K-point data 504 of FIG. 5, denoted as $|\tilde{Y}_{n,k}|$, with $\tilde{Y}_{n,k}$ calculated using equation 4.

In this example, it can be confirmed that the tone energy is not only mostly concentrated around $(\hat{n},\hat{k})$ but also spreads vertically and horizontally. $(\hat{n},\hat{k})$ can be calculated using equation 5. Also in this example, the tone energy can include an approximate range of −15 decibel (dB) to −10 dB and $(\hat{n},\hat{k})$ is (520, 70).

Figure 8:
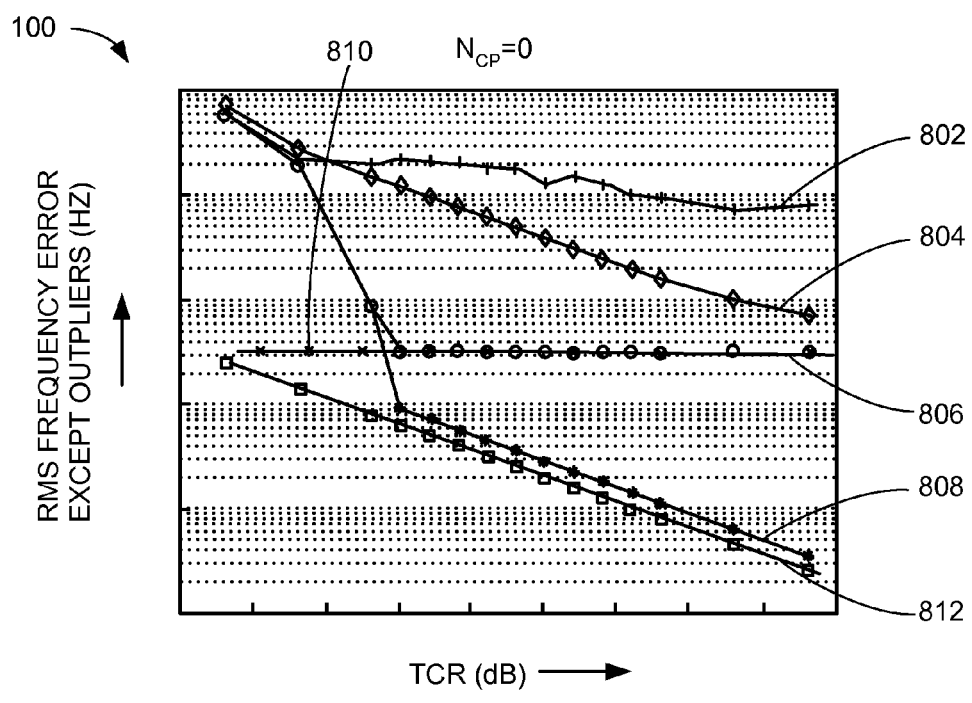
FIG. 8 is a first example of a graph of frequency error of the communication system.

Referring now to FIG. 8, therein is shown a first example of a graph of frequency error of the communication system 100. In the first example and subsequent examples, the description is based on operation parameters, which include Fast Fourier transform (FFT) size=2048, number of occupied subcarriers=1200, K=140, sampling period=1/(15000×N)=32.55× 10$^{-9}$ seconds (sec), carrier to noise ratio (dB)=20 decibels (dB), modulation=quadrature amplitude modulation 16-QAM, and channel=additive white Gaussian noise (AWGN). Results shown by this graph and subsequent graphs indicate that the proposed operations achieve near optimal performance.

In this example, the system bandwidth is 30.72 MHz while the occupied bandwidth is 18 MHz. The tone location is randomly generated within the occupied bandwidth. An outlier event can be represented as:

$$|\omega_T - \hat{\omega}_T| > \frac{2\pi}{N} \quad \text{(Equation 25)}$$

For example, the frequency error is larger than subcarrier spacing of 15 kHz. This outlier can cause a huge frequency error since the interpolator tries to find a fine tone frequency within, for example, three samples.

For N=2048, the tone signal can increase up to 33 dB when it interferes with the closest subcarrier. For the subcarrier directly hit by the tone interference, tone to signal power ratio is N times higher at this subcarrier than raw tone to signal power ratio in time domain. This ratio is called tone to carrier ratio (TCR) and is calculated as follows.

$$TCR = N \times \frac{\text{Tone signal power}}{\text{OFDM signal power}} \text{ in time domain} \quad \text{(Equation 26)}$$

The goal is to minimize root mean square (RMS) error regardless of noise statistics. The Cramér-Rao (CR) bounds are given under independent and identically distributed (i.i.d.) Gaussian noise assumption. However, the zero mean i.i.d. signal can become approximate i.i.d. Gaussian after processed by the K-point transform modules 318 of FIG. 3 by the central limit theorem, for example, in $\tilde{w}_{n,k}$ of equation 4. Therefore, the processed signal can be treated as i.i.d. Gaussian noise, and the CR bounds in are fundamental performance limits.

In this setup, RMS frequency error within DFT resolution is limited by $$\frac{1}{2\sqrt{3}} \frac{2\pi}{K(N+N_{CP})} \quad \text{(Equation 27)}$$

The graph depicts root means square (RMS) frequency errors for estimation methods including naive estimate, the proposed operation of the present invention, within DFT resolution, and the CR bound in when $N_{CP}$=0. The RMS frequency errors are depicted with a naive frequency error 802, a first frequency error 804, a second frequency error 806, a third frequency error 808, a resolution frequency error 810, and a bound frequency error 812.

The resolution frequency error 810 represents an error that is within DFT resolution and is limited by $$\frac{1}{2\sqrt{3}} \frac{2\pi}{K(N+N_{CP})} \quad \text{(Equation 28)}$$

The bound frequency error 812, denoted as Var $(\hat{\omega}_T)$, represents an error associated with the Cramér-Rao (CR) bound of frequency estimation $\hat{\omega}_T$ as follows.

$$\text{Var}(\hat{\omega}_T) \geq \frac{6\sigma^2}{a^2 L(L^2-1)} \quad \text{(Equation 29)}$$

where $\sigma^2 = E[|w_n|^2]$. "$a^2/\sigma^2$" represents tone to noise ratio (TNR).

The graph depicts the RMS frequency errors when there is no cyclic prefix. The naive frequency error 802 using a naive estimation method can have a high error floor while the proposed frequency estimation operation improves described above has improved estimation performance. The improved estimation performance is depicted with the first frequency error 804, the second frequency error 806, and the third frequency error 808 lower than the naive frequency error 802.

The first frequency error 804 is generated with equation 9. The improved estimation performance is further provided with additional steps using equations 12 and 16 to generate the second frequency error 806 and the third frequency error 808, respectively. The estimation performance is further improved with the second frequency error 806 lower than the first frequency error 804 and further with the third frequency error 808 lower than the second frequency error 806.

The estimation performance is further improved also with the third frequency error 808 lower than the resolution frequency error 810. The third frequency error 808 is approaching and closer to the bound frequency error 812 than other frequency errors.

Figure 9:
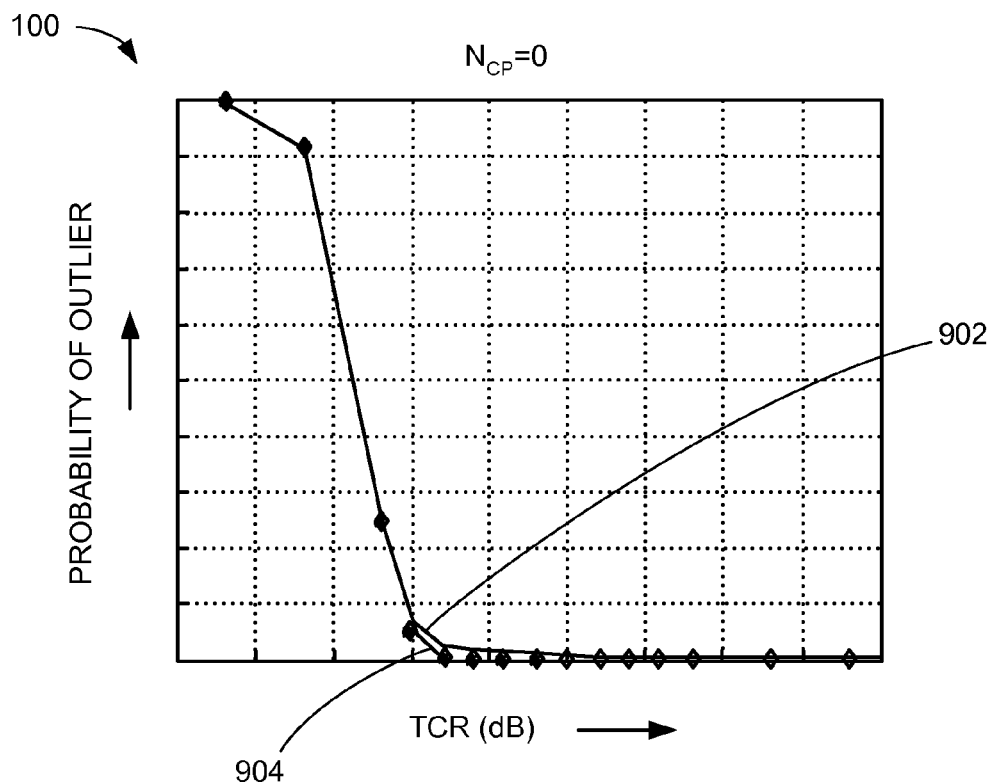
FIG. 9 is a first example of a graph of probability of outlier of the communication system.

Referring now to FIG. 9, therein is shown a first example of a graph of probability of outlier of the communication system 100. The graph depicts the probability of outlier for the naive estimation method and the proposed operation using the K-point transform modules 318 of FIG. 3 in frequency domain. The graph depicts probability error results of a DFT-based estimator using the time domain L-point DFT and an interpolator proposed when there is no cyclic prefix (NCP=0).

The graph depicts a naive outlier probability 902 and a resulting outlier probability 904. The naive outlier probability 902 and the resulting outlier probability 904 indicate a probability of outlier with magnitude of frequency error greater than 15 kilohertz (kHz).

The naive outlier probability 902 is a result based on a naive estimation method. The resulting outlier probability 904 is a result of the proposed operation in the present invention using equation 9, 12, or 16. The resulting outlier probability 904 is lower than the naive outlier probability 902. The graph also depicts the proposed operation using the equation 9, 12, or 16 results in a lower TCR than that of the naive estimation method.

Figure 10:
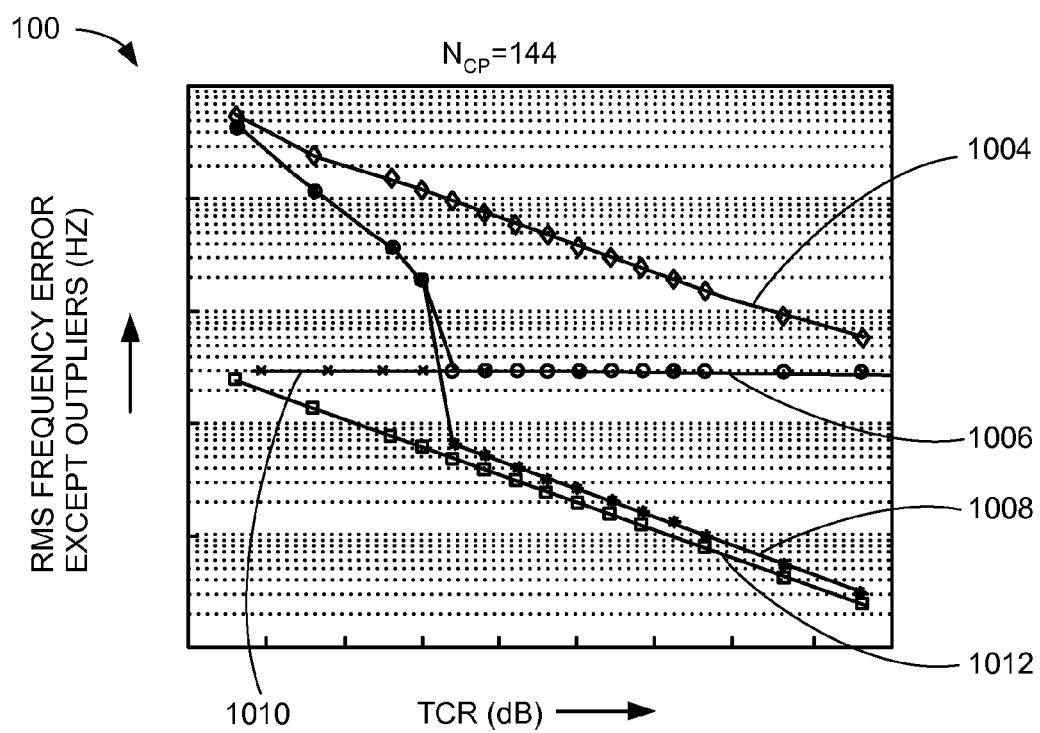
FIG. 10 is a second example of a graph of frequency error of the communication system.

Referring now to FIG. 10, therein is shown a second example of a graph of frequency error of the communication system 100. The graph depicts root means square (RMS) frequency errors for estimation methods including the proposed operation of the present invention, within DFT resolution, and the CR bound in when NCP=144. The RMS frequency errors are depicted with a first frequency error 1004, a second frequency error 1006, a third frequency error 1008, a resolution frequency error 1010, and a bound frequency error 1012.

The resolution frequency error 1010 represents an error that is within DFT resolution and is limited by equation 28. The bound frequency error 1012, denoted as Var ($\omega_T$), represents an error associated with the Cramér-Rao (CR) bound of frequency estimation $\omega_T$ as calculated by equation 29.

The graph depicts the RMS frequency errors when NCP=144. The first frequency error 1004 is generated with equation 9. The improved estimation performance is further provided with additional steps using equations 10 and 16 to generate the second frequency error 1006 and the third frequency error 1008, respectively. The estimation performance is further improved with the second frequency error 1006 lower than the first frequency error 1004 and further with the third frequency error 1008 lower than the second frequency error 1006.

The estimation performance is further improved also with the third frequency error 1008 lower than the resolution frequency error 1010. The third frequency error 1008 is approaching and closer to the bound frequency error 1012 than other frequency errors.

The proposed frequency estimation operation performs better than other estimation operations even with cyclic prefix. For TCR≥−3 dB, the frequency estimator works reliably without producing many outliers regardless of its further improvement using equations 12 and 16. There exists only insignificant difference in the probability of outlier of frequency estimates using equations 9, 12, and 16 while the naive estimation yields higher probability of outlier. FIGS. 8 and 10 depict that the frequency estimation using equation 12 is basically limited by DFT frequency resolution for TCR≥−5 dB and TCR≥−3 dB, respectively, while equation 16 of the frequency estimation operation achieves the performance close to CR bound with 2.5 dB gap from TCR=−5 dB and TCR=−3 dB for $N_{CP}$=0 and $N_{CP}$=144, respectively.

Figure 11:
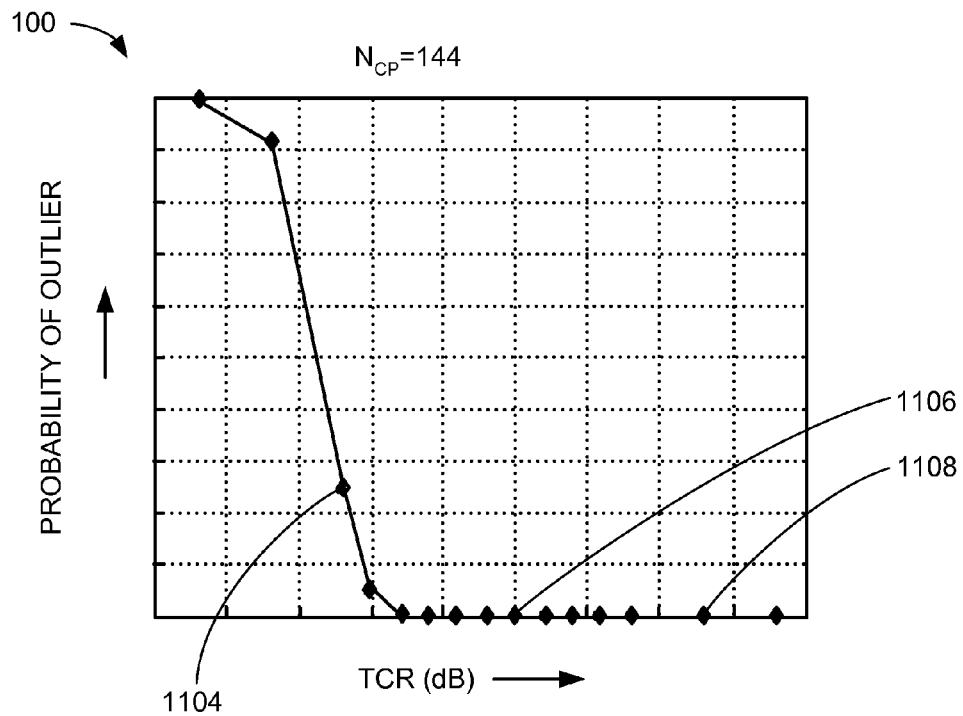
FIG. 11 is a second example of a graph of probability of outlier of the communication system.

Referring now to FIG. 11, therein is shown a second example of a graph of probability of outlier of the communication system 100. The graph depicts the probability of outlier for the proposed operation using the K-point transform modules 318 of FIG. 3 in frequency domain. The graph depicts probability error results of a DFT-based estimator using the time domain L-point DFT and an interpolator proposed when there is cyclic prefix ($N_{CP}$) of 144.

The graph depicts a first resulting outlier probability 1104, a second resulting outlier probability 1106, and a third resulting outlier probability 1108. The first resulting outlier probability 1104, the second resulting outlier probability 1106, and the third resulting outlier probability 1108 indicate a probability of outlier with magnitude of frequency error greater than 15 kilohertz (kHz).

The first resulting outlier probability 1104, the second resulting outlier probability 1106, and the third resulting outlier probability 1108 are results of the proposed operation in the present invention using equation 11, 12, and 16, respectively. The first resulting outlier probability 1104, the second resulting outlier probability 1106, and the third resulting outlier probability 1108 are shown approximately equal to each other.

Figure 12:
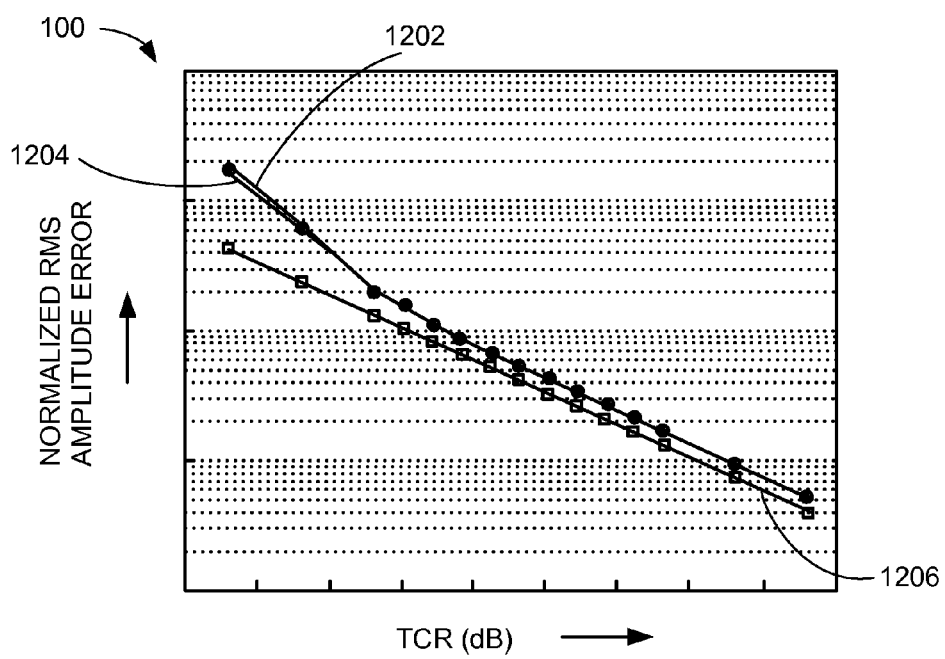
FIG. 12 is an example of a graph of normalized error and Cramér-Rao bound of the communication system.

Referring now to FIG. 12, therein is shown an example of a graph of normalized error and Cramér-Rao bound of the communication system 100. The graph depicts a first normalized amplitude error 1202, a second normalized amplitude error 1204, and a bound normalized amplitude error 1206. The first normalized amplitude error 1202, the second normalized amplitude error 1204, and the bound normalized amplitude error 1206 represent root mean square amplitude errors.

The first normalized amplitude error 1202 and the second normalized amplitude error 1204 are error results using equation 23 for $N_{CP}$=0 and $N_{CP}$=144, respectively. The first normalized amplitude error 1202 and the second normalized amplitude error 1204 are RMS amplitude estimation errors normalized by tone amplitude, i.e., RMS of (â−a)/a, for $N_{CP}$=0 and $N_{CP}$=144, respectively.

The bound normalized amplitude error 1206 is an error result using $$Var(\hat{a}) \geq \sigma^2/2L \qquad \text{(Equation 30)}$$

Both the first normalized amplitude error 1202 and the second normalized amplitude error 1204 can approach the bound normalized amplitude error 1206 with 2 dB gap. Approximately 10% normalized RMS amplitude estimation error is achieved around TCR=−2.5 dB.

While the spectrum analysis is limited by the size of DFT, the communication system 100 includes operations that combine an increased amount of data samples only using DFTs of much smaller sizes. This approach effectively lowers the CR bound, which is the fundamental performance limit of estimators. As a result, the proposed operations reliably estimate tone parameters even if the tone amplitude is small in time domain. The performance of the present invention approaches the CR bounds even at moderate TCR. This technique provides improved reliability for estimation of frequency and amplitude of tone interference in OFDM systems.

The physical transformation of the frequency-domain data 310 of FIG. 3 generated by the N-point transform modules 302 of FIG. 3 and the K-point data 320 of FIG. 3 generated by the K-point transform modules 318 of FIG. 3 based on the time-domain data 108 of FIG. 1 received through the communication path 106 of FIG. 1 results in movement in the physical world, such as people using the first station 102 of FIG. 1 or the second station 104 of FIG. 1 to estimate the tone interference frequency 334 of FIG. 3 and the tone interference amplitude 338 of FIG. 3 for detection of tone signals and elimination of tone interferences to improve system performance, based on the operation of the communication system 100 of FIG. 1. As the movement in the physical world occurs, the movement itself creates additional information that is converted back to the time-domain data 108 sent through the communication path 106 for the continued operation of the communication system 100 and to continue the movement in the physical world.

Thus, it has been discovered that the communication system 100 of the present invention furnish or furnishes important and heretofore unknown and unavailable solutions, capabilities, and functional aspects for a communication system with point of interest validation.

The communication system 100 describes the module functions or order as an example. The modules can be partitioned differently. For example, the first interpolation module 322 of FIG. 3 and the second interpolation module 328 of FIG. 3 can be implemented in the same module. Each of the modules can operate individually and independently of the other modules.

The modules described can be implemented in hardware as hardware accelerators in the first control unit 212 of FIG. 2 or the second control unit 234 of FIG. 2. The modules described can be implemented in other hardware units in the first station 102 or the second station 104 but outside the first control unit 212 or the second control unit 234.

Figure 13:
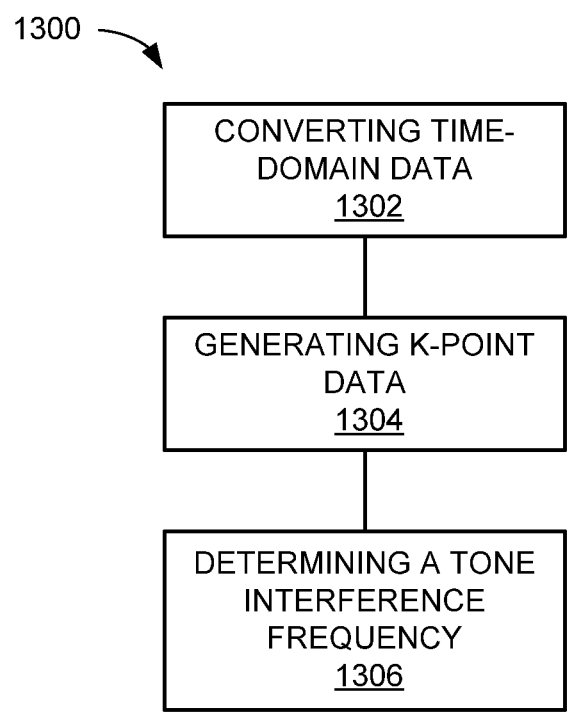
FIG. 13 is a flow chart of a method of operation of the communication system of FIG. 1 in a further embodiment of the present invention.

Referring now to FIG. 13, therein is shown a flow chart of a method 1300 of operation of the communication system 100 of FIG. 1 in a further embodiment of the present invention. The method 1300 includes: converting time-domain data to frequency-domain data based on an N-point transform size in a block 1302; generating K-point data based on the frequency-domain data and the N-point transform size in a block 1304; and determining a tone interference frequency based on the K-point data for elimination of tone interference to improve system performance in a block 1306.

Thus, it has been discovered that the communication system of the present invention furnishes important and heretofore unknown and unavailable solutions, capabilities, and functional aspects for a communication system with signal processing mechanism. The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operation of a communication system comprising:
   receiving time-domain data;
   converting the time-domain data to frequency-domain data based on an N-point transform size;
   generating K-point data based on the frequency-domain data and the N-point transform size; and
   determining a tone interference frequency with a control unit based on the K-point data for elimination of tone interference to improve system performance, the tone interference frequency for representing a rate of oscillation.

2. The method as claimed in claim 1 wherein:
   converting the time-domain data includes converting the time-domain data having a size based on a K-point transform size, the N-point transform size, and a length of a cyclic prefix; and
further comprising:
   determining a tone interference amplitude based on a reciprocal of the size of the time-domain data for elimination of the tone interference to improve the system performance.

3. The method as claimed in claim 1 wherein:
   converting the time-domain data includes converting the time-domain data having a size based on the N-point transform size and a length of a cyclic prefix; and
   determining the tone interference frequency includes estimating a second noise frequency based on a sum of the N-point transform size and the length of the cyclic prefix.

4. The system as claimed in claim 1 wherein:
   generating the K-point data includes generating the K-point data based on a K-point transform size; and
   determining the tone interference frequency includes calculating a peak K-point data based on a square root of the K-point transform size.

5. The method as claimed in claim 1 wherein:
   converting the time-domain data includes converting the time-domain data having a size based on the N-point transform size; and
further comprising:
   determining a tone interference amplitude based on a square root of the N-point transform size.

6. A method of operation of a communication system comprising:
   receiving time-domain data;
   converting a number of data samples of the time-domain data to frequency-domain data based on an N-point transform size;
   generating K-point data based on the frequency-domain data and the N-point transform size; and
   determining a tone interference frequency with a control unit based on the K-point data for elimination of tone interference to improve system performance, the tone interference frequency for representing a rate of oscillation.

7. The method as claimed in claim 6 wherein:
   converting the time-domain data includes converting the time-domain data having a size based on a K-point transform size, the N-point transform size, and a length of a cyclic prefix; and
further comprising:
   determining a tone interference amplitude based on a reciprocal of a product of the K-point transform size and a sum of the N-point transform size and the length of the cyclic prefix for elimination of the tone interference to improve the system performance.

8. The method as claimed in claim 6 wherein:
   converting the time-domain data includes converting the time-domain data having a size based on the N-point transform size and a length of a cyclic prefix; and
   determining the tone interference frequency includes estimating a second noise frequency based on a reciprocal of a sum of the N-point transform size and the length of the cyclic prefix.

9. The method as claimed in claim 6 wherein:
   generating the K-point data includes generating the K-point data based on a K-point transform size; and determining the tone interference frequency includes calculating a peak K-point data based on a reciprocal of a square root of the K-point transform size.

10. The method as claimed in claim 6 wherein:
converting the time-domain data includes converting the time-domain data having a size based on the N-point transform size; and further comprising:
determining a tone interference amplitude based on a square root of the N-point transform size and a product of the tone interference frequency and half of the N-point transform size.

11. A communication system comprising:
a communication unit configured to communicate time-domain data;
a control unit, coupled to the communication unit, configured to:
convert the time-domain data to frequency-domain data based on an N-point transform size;
generate K-point data based on the frequency-domain data and the N-point transform size; and
determine a tone interference frequency based on the K-point data for elimination of tone interference to improve system performance, the tone interference frequency for representing a rate of oscillation.

12. The system as claimed in claim 11 wherein the control unit is configured to:
convert the time-domain data having a size based on a K-point transform size, the N-point transform size, and a length of a cyclic prefix; and
determine a tone interference amplitude based on a reciprocal of the size of the time-domain data for elimination of the tone interference to improve the system performance.

13. The system as claimed in claim 11 wherein the control unit is configured to:
convert the time-domain data having a size based on the N-point transform size and a length of a cyclic prefix; and
estimate a second noise frequency based on a sum of the N-point transform size and the length of the cyclic prefix.

14. The system as claimed in claim 11 wherein the control unit is configured to:
generate the K-point data based on a K-point transform size; and
calculate a peak K-point data based on a square root of the K-point transform size.

15. The system as claimed in claim 11 wherein the control unit is configured to:
convert the time-domain data having a size based on the N-point transform size; and
determine a tone interference amplitude based on a square root of the N-point transform size.

16. The system as claimed in claim 11 wherein the control unit is configured to convert a number of data samples of the time-domain data to the frequency-domain data with the N-point transform size.

17. The system as claimed in claim 16 wherein the control unit is configured to:
convert the time-domain data having a size based on the K-point transform size, the N-point transform size, and a length of a cyclic prefix; and
determine a tone interference amplitude based on a reciprocal of a product of the K-point transform size and a sum of the N-point transform size and the length of the cyclic prefix for elimination of the tone interference to improve the system performance.

18. The system as claimed in claim 16 wherein the control unit is configured to:
convert the time-domain data having a size based on the N-point transform size and a length of a cyclic prefix; and
estimate a second noise frequency based on a reciprocal of a sum of the N-point transform size and the length of the cyclic prefix.

19. The system as claimed in claim 16 wherein the control unit is configured to:
generate the K-point data based on a K-point transform size; and
calculate a peak K-point data based on a reciprocal of a square root of the K-point transform size.

20. The system as claimed in claim 16 wherein the control unit is configured to:
convert the time-domain data having a size based on the N-point transform size; and
determine a tone interference amplitude based on a square root of the N-point transform size and a product of the tone interference frequency and half of the N-point transform size.

* * * * *